United States Patent
Scoles et al.

[11] Patent Number: 5,935,475
[45] Date of Patent: Aug. 10, 1999

[54] SUSCEPTOR INTEGRATION INTO REINFORCED THERMOPLASTIC COMPOSITES

[75] Inventors: Roger W. Scoles, Andover; William E. Woolley, Wichita, both of Kans.

[73] Assignee: The Boeing Company, Seattle, Wash.

[21] Appl. No.: 09/055,028

[22] Filed: Apr. 3, 1998

Related U.S. Application Data

[62] Division of application No. 08/688,071, Jul. 29, 1996
[60] Provisional application No. 60/019,354, Jun. 6, 1996.

[51] Int. Cl.$^6$ .......................................................... H05B 6/10
[52] U.S. Cl. ........................... 219/633; 219/634; 219/645
[58] Field of Search ..................... 219/618, 632, 219/633, 634, 635, 645; 156/358

[56] References Cited

U.S. PATENT DOCUMENTS

| | | |
|---|---|---|
| 2,231,312 | 5/1941 | Luty . |
| 2,273,423 | 2/1942 | Somes . |
| 2,372,920 | 4/1945 | Blessing . |
| 2,378,801 | 6/1945 | Sidell et al. . |
| 2,423,922 | 7/1947 | Arndt, Jr. . |
| 2,589,777 | 3/1952 | Collins . |
| 2,739,829 | 3/1956 | Pedlow et al. . |
| 2,761,941 | 9/1956 | Ardichvili . |
| 2,898,435 | 8/1959 | Crafts . |
| 3,101,403 | 8/1963 | Lewis et al. . |
| 3,183,460 | 5/1965 | Bennon . |
| 3,288,979 | 11/1966 | Mills et al. . |
| 3,395,261 | 7/1968 | Leatherman et al. . |
| 3,431,379 | 3/1969 | Yrene . |
| 3,450,856 | 6/1969 | Buck et al. . |
| 3,492,453 | 1/1970 | Hurst . |
| 3,507,735 | 4/1970 | Chisholm . |
| 3,574,031 | 4/1971 | Heller, Jr. et al. . |
| 3,845,268 | 10/1974 | Sindt . |
| 3,864,186 | 2/1975 | Balla . |
| 3,941,643 | 3/1976 | Balla . |
| 3,946,349 | 3/1976 | Haldeman, III . |
| 3,966,402 | 6/1976 | Sindt . |
| 4,005,302 | 1/1977 | Graf et al. . |
| 4,029,837 | 6/1977 | Leatherman . |
| 4,029,926 | 6/1977 | Austin . |
| 4,091,254 | 5/1978 | Struve . |
| 4,120,712 | 10/1978 | Sindt . |
| 4,180,717 | 12/1979 | Lenk et al. . |
| 4,288,673 | 9/1981 | Ishibashi . |

(List continued on next page.)

FOREIGN PATENT DOCUMENTS

| 0 461 979 | 4/1994 | European Pat. Off. . |
|---|---|---|
| 54-25542 | 2/1979 | Japan . |

OTHER PUBLICATIONS

J. Giachino, "Welding Skills and Practices", Am. Tech. Soc., Chicago, IL (1960, 1965, 1967, 1971, 1976) 393–401.
Border et al., "Induction Heated Joining of Thermoplastic Composites without Metal Susceptors," 34$^{th}$ Int'l SAMPE Symp. May 8–11, 1989, pp. 2569–2578.

*Primary Examiner*—Tu Ba Hoang
*Attorney, Agent, or Firm*—John C. Hammar

[57] ABSTRACT

Problems associated with accurately positioning a susceptor at the bond line between two or more prefabricated, fiber reinforced, resin composite detail parts to facilitate thermoplastic welding (i.e., fusion bonding) between the detail parts. The integrated susceptor detail part is compatible with Z-pinning along the bond line for the pulloff strength enhancement associated with Z-pin reinforcement. We make the parts by (1) preparing the faying overface of the prefabricated part or prepreg preform for the overlayment of the bond line materials, (2) placing a thermoplastic film on the part or preform, (3) placing the susceptor on the film, and (4) securing the film and susceptor to the part by applying suitable heat and pressure to produce a prefabricated, consolidated detail part having an integrated susceptor in a resin rich region intended as the bond line to other parts in the final assembly.

12 Claims, 17 Drawing Sheets

U.S. PATENT DOCUMENTS

| | | |
|---|---|---|
| 4,296,295 | 10/1981 | Kiuchi . |
| 4,304,975 | 12/1981 | Lenk et al. . |
| 4,313,777 | 2/1982 | Buckley et al. . |
| 4,343,982 | 8/1982 | Schwartz et al. . |
| 4,352,142 | 9/1982 | Olson . |
| 4,355,222 | 10/1982 | Geithman et al. . |
| 4,382,113 | 5/1983 | Schwartz et al. . |
| 4,416,713 | 11/1983 | Brooks . |
| 4,421,588 | 12/1983 | Davies . |
| 4,429,341 | 1/1984 | King . |
| 4,445,951 | 5/1984 | Lind et al. . |
| 4,479,163 | 10/1984 | Bannink, Jr. et al. . |
| 4,502,092 | 2/1985 | Bannink, Jr. et al. . |
| 4,521,659 | 6/1985 | Buckley et al. . |
| 4,542,056 | 9/1985 | Anglin et al. . |
| 4,599,255 | 7/1986 | Anglin et al. . |
| 4,653,396 | 3/1987 | Wennerberg . |
| 4,671,470 | 6/1987 | Jonas . |
| 4,673,450 | 6/1987 | Burke . |
| 4,755,904 | 7/1988 | Brick . |
| 4,768,433 | 9/1988 | Boissevain . |
| 4,791,260 | 12/1988 | Waldman . |
| 4,822,972 | 4/1989 | Sugioka et al. . |
| 4,839,771 | 6/1989 | Covey . |
| 4,897,518 | 1/1990 | Mucha et al. . |
| 4,904,972 | 2/1990 | Mori et al. . |
| 4,919,759 | 4/1990 | Ilmarinen et al. . |
| 4,947,464 | 8/1990 | Mori et al. . |
| 4,978,825 | 12/1990 | Schmidt et al. . |
| 5,001,319 | 3/1991 | Holmstrom . |
| 5,047,605 | 9/1991 | Ogden . |
| 5,074,019 | 12/1991 | Link . |
| 5,079,817 | 1/1992 | Anstotz et al. . |
| 5,101,086 | 3/1992 | Dion et al. . |
| 5,199,791 | 4/1993 | Kasanami et al. . |
| 5,225,025 | 7/1993 | Lambing et al. ........................ 156/358 |
| 5,240,542 | 8/1993 | Miller et al. . |
| 5,248,864 | 9/1993 | Kodokian . |
| 5,250,776 | 10/1993 | Pfaffmann . |
| 5,283,409 | 2/1994 | Brendel et al. . |
| 5,313,034 | 5/1994 | Grimm et al. . |
| 5,313,037 | 5/1994 | Hanson et al. . |
| 5,340,428 | 8/1994 | Kodokian . |

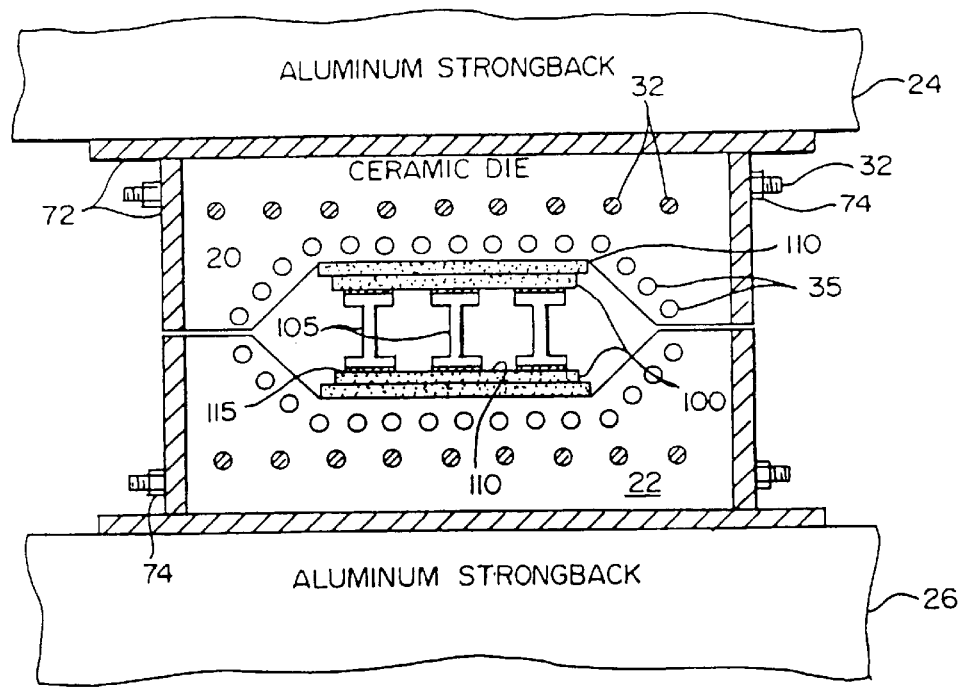
FIG.3
FIG.4
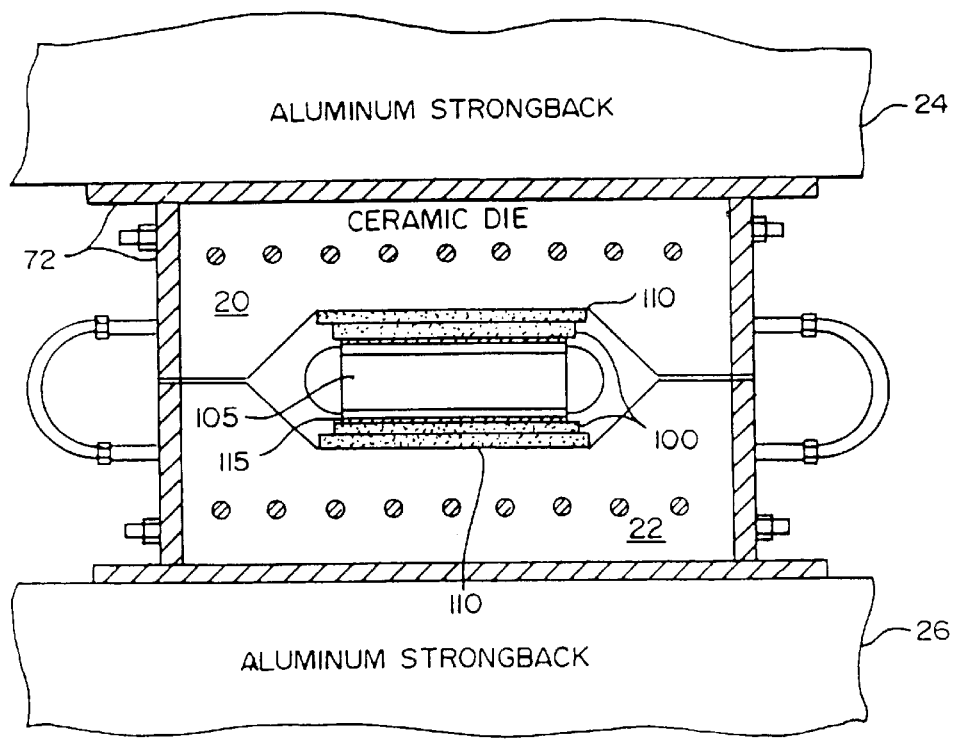

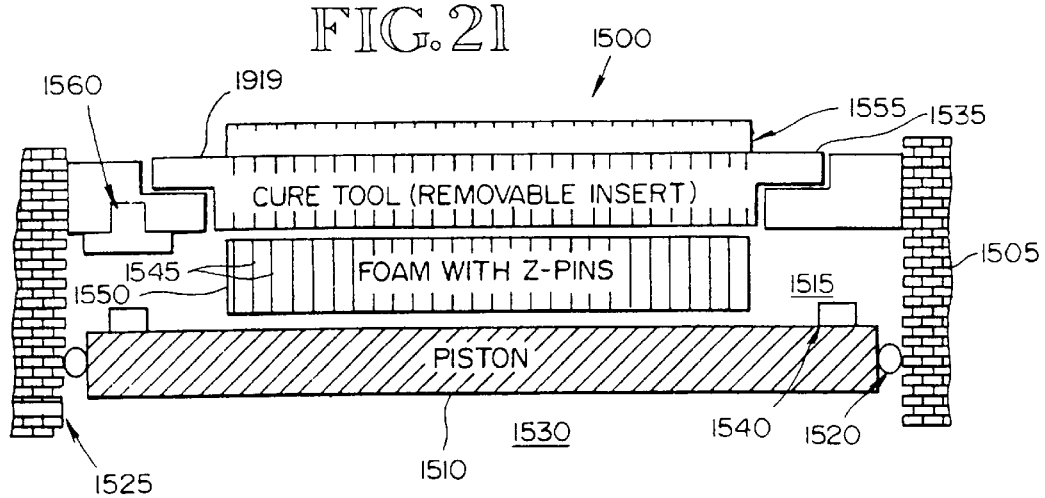
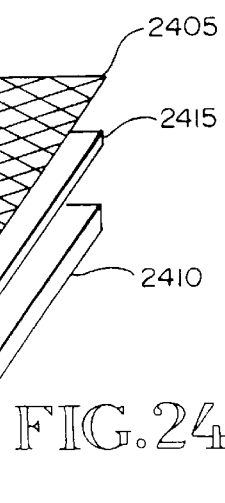

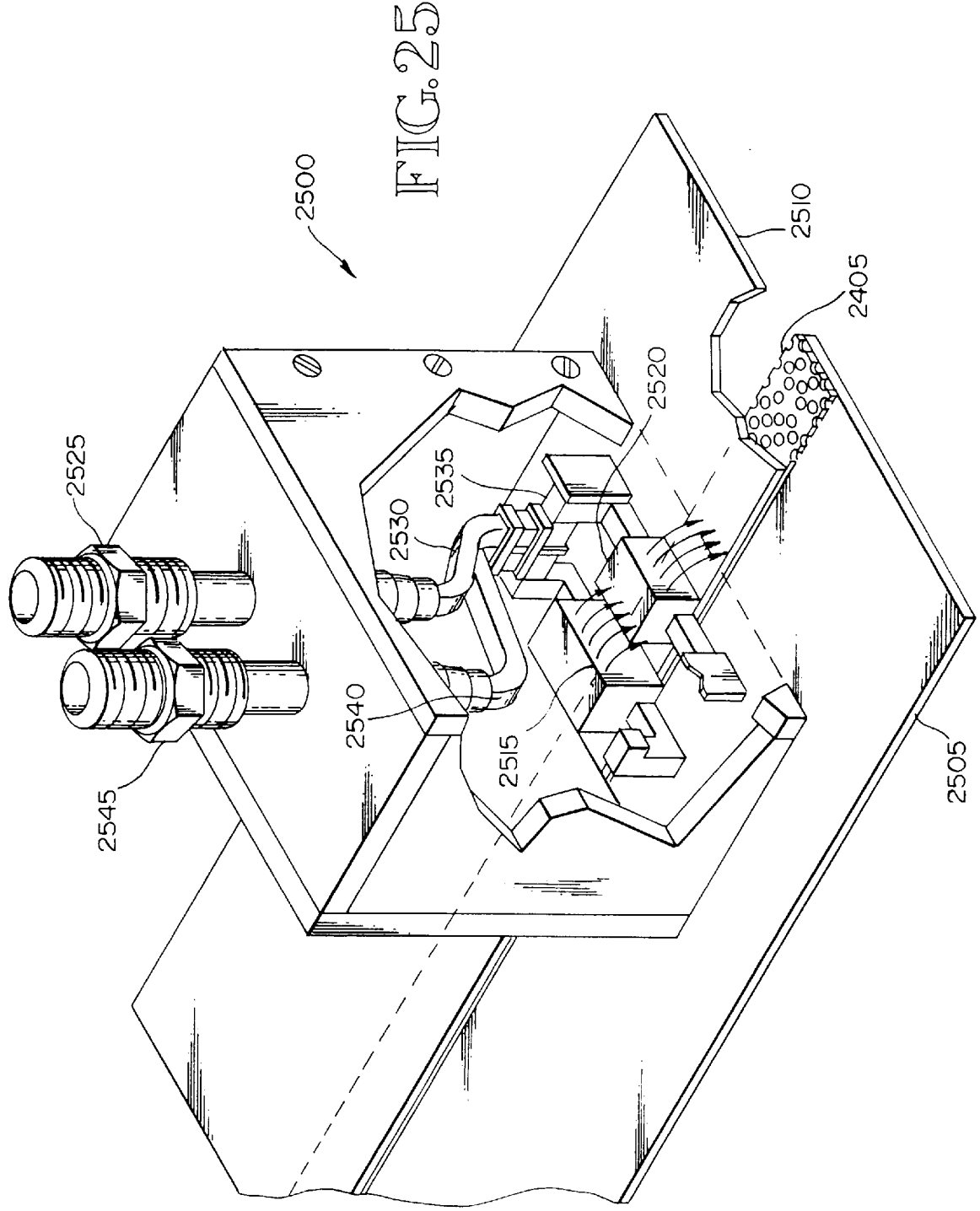

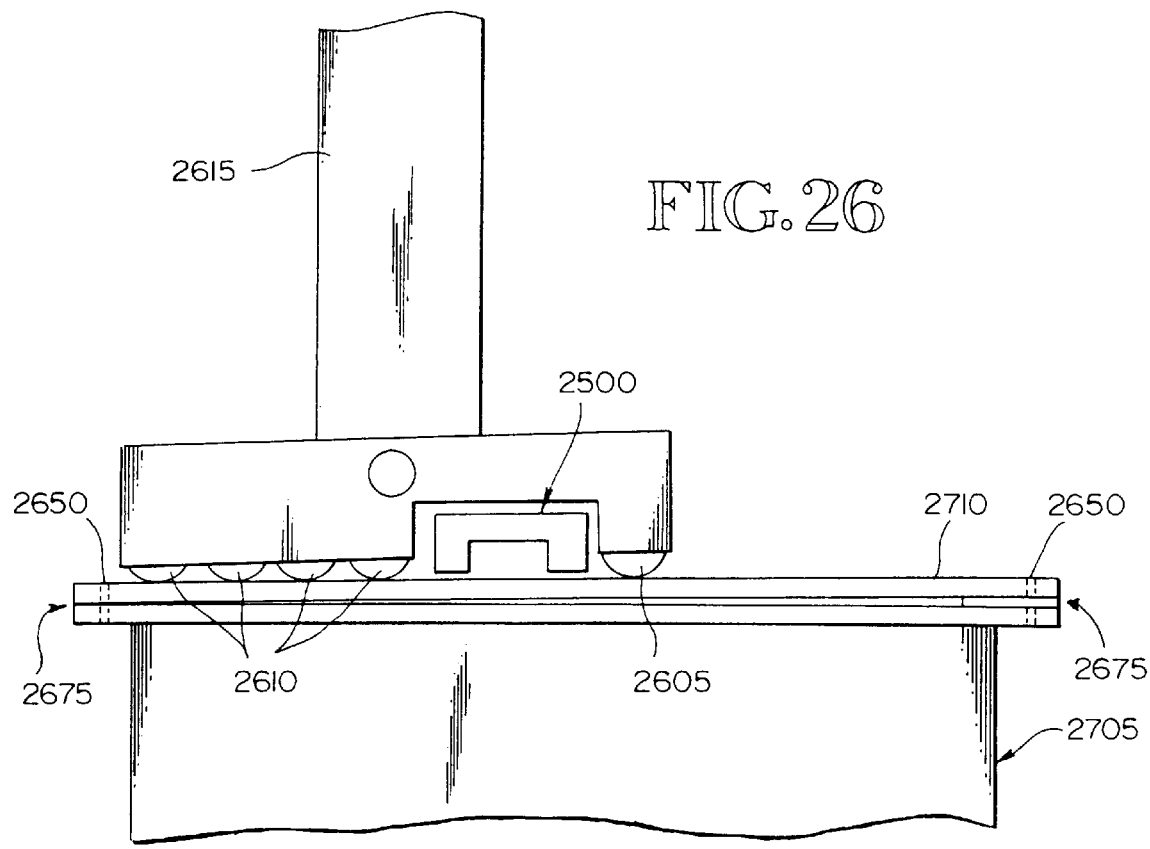
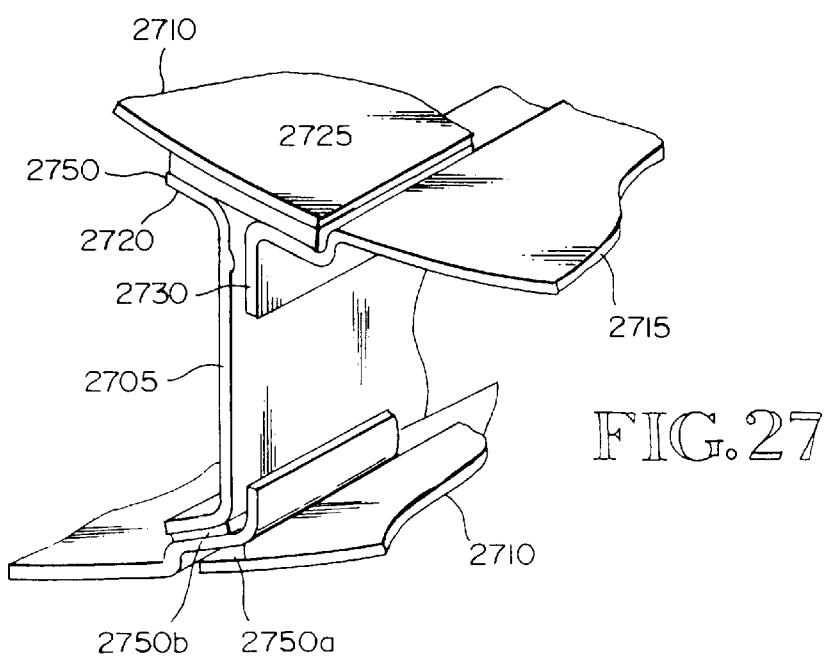

SUSCEPTOR INTEGRATION INTO REINFORCED THERMOPLASTIC COMPOSITES

REFERENCE TO RELATED APPLICATION

The present application is a divisional application based upon U.S. patent application Ser. No. 08/688,071, filed Jul. 29, 1996, and claims the benefit of U.S. Provisional Patent Application 60/019,354, filed Jun. 6, 1996.

TECHNICAL FIELD

The present invention relates to reinforced, thermoplastic composite detail parts having a welding susceptor incorporated along at least one faying surface and to methods for welding together assemblies from the detail parts.

BACKGROUND ART

The use of composites in primary structure in aerospace applications is limited today because of the relatively high cost. A significant contribution to the total cost is the assembly cost where the precured composite elements are assembled, drilled, and fastened. The necessary design for mechanical fastening complicates the structure, especially in thin sections, because of the need for access to both sides of the bond line.

While composites might be adhesively bonded, cocured, or welded, these connecting processes generally produce bonds that rely upon the resin matrix for strength. The bond line lacks any reinforcing material to help with load transfer. These bonds generally have modest strength, and are susceptible to disbonding with shock impact or other "out of plane" forces affecting the assembly. Such forces often arise in environments prone to vibration.

Composite Manufacturing

Fiber-reinforced organic resin matrix composites have a high strength-to-weight ratio (specific strength) or a high stiffness-to-weight ratio (specific stiffness) and desirable fatigue characteristics that make them increasingly popular as a replacement for metal in aerospace applications where weight, strength, or fatigue is critical. Thermoplastic or thermoset organic resin composites would be more economical with improved manufacturing processes that reduced touch labor and forming time.

Prepregs combine continuous, woven, or chopped reinforcing fibers with an uncured matrix resin, and usually comprise fiber sheets with a thin film of the matrix. Sheets of prepreg generally are placed (laid-up) by hand or with fiber placement machines directly upon a tool or die having a forming surface contoured to the desired shape of the completed part or are laid-up in a flat sheet which is then draped and formed over the tool or die to the contour of the tool. Then the resin in the prepreg lay up is consolidated (i.e. pressed to remove any air, gas, or vapor) and cured (i.e., chemically converted to its final form usually through chain-extension or fused into a single piece) in a vacuum bag process in an autoclave (i.e., a pressure oven) to complete the part.

The tools or dies for composite processing typically are formed to close dimensional tolerances. They are massive, must be heated along with the workpiece, and must be cooled prior to removing the completed part. The delay caused to heat and to cool the mass of the tools adds substantially to the overall time necessary to fabricate each part. These delays are especially significant when the manufacturing run is low rate where the dies need to be changed frequently, often after producing only a few parts of each kind. An autoclave has similar limitations; it is a batch operation.

In hot press forming, the prepreg is laid-up to create a preform, which is bagged (if necessary), and placed between matched metal tools that include forming surfaces to define the internal, external, or both mold lines of the completed part. The tools and composite preform are placed within a press and then the tools, press, and preform are heated.

The tooling in autoclave or hot press fabrication is a significant heat sink that consumes substantial energy. Furthermore, the tooling takes significant time to heat the composite material to its consolidation temperature and, after curing the composite, to cool to a temperature at which it is safe to remove the finished composite part.

As described in U.S. Pat. No. 4,657,717 a flat composite prepreg panel was sandwiched between two metal sheets made from a superplastically formable alloy, and was formed against a die having a surface precisely contoured to the final shape of the part.

Attempts have been made to reduce composite fabrication times by actively cooling the tools after forming the composite part. These attempts have shortened the time necessary to produce a composite part, but the cycle time for heating and cooling remains long. Designing and making tools to permit their active cooling also increases their cost.

Boeing described a process for organic matrix forming and consolidation using induction heating in U.S. Pat. No. 5,530,227. There, Boeing laid up prepregs in a flat sheet sandwiched between aluminum susceptor face sheets. The face sheets were susceptible to heating by induction and formed a retort to enclose the prepreg preform. To ensure an inert atmosphere around the preform during curing and to permit withdrawing volatiles and outgassing during the consolidation, the face sheets are welded around their periphery. Such welding unduly increases the preparation time and the cost for part fabrication. It also ruined the face sheets (i.e., prohibited their reuse which added a significant cost penalty to each part fabricated with this approach). Boeing described in U.S. Pat. No. 5,599,472 a technique that readily and reliably sealed the face sheets of the retort without the need for welding and permitted reuse of the face sheets in certain circumstances. This "bag-and-seal" technique applies to both resin composite and metal processing.

2. Processing in an Induction Press

The dies or tooling for induction processing are ceramic because a ceramic is not susceptible to induction heating and, preferably, is a thermal insulator (i.e., a relatively poor conductor of heat). Ceramic tooling is strengthened and reinforced internally with fiberglass rods or other appropriate reinforcements and externally with metal or other durable strongbacks to permit it to withstand the temperatures and pressures necessary to form, to consolidate, or otherwise to process the composite materials or metals. Ceramic tools cost less to fabricate than metal tools of comparable size and have less thermal mass than metal tooling, because they are unaffected by the induction field. Because the ceramic tooling is not susceptible to induction heating, it is possible to embed induction heating elements in the ceramic tooling and to heat the composite or metal retort without significantly heating the tools. Thus, induction heating can reduce the time required and energy consumed to fabricate a part.

While graphite or boron fibers can be heated directly by induction, most organic matrix composites require a susceptor in or adjacent to the composite material preform to achieve the necessary heating for consolidation or forming. The susceptor is heated inductively and transfers its heat principally through conduction to the preform or workpiece that, in our prior work, is sealed within the susceptor retort.

Enclosed in the metal retort, the workpiece does not experience the oscillating magnetic field which instead is absorbed in the retort sheets. Heating is by conduction from the retort to the workpiece.

Induction focuses heating on the retort (and workpiece) and eliminates wasteful, inefficient heat sinks. Because the ceramic tools in our induction heating workcell do not heat to as high a temperature as the metal tooling of conventional, prior art presses, problems caused by different coefficients of thermal expansion between the tools and the workpiece are reduced. Furthermore, Boeing's induction heating press is energy efficient because significantly higher percentages of input energy go to heating the workpiece than occurs with conventional presses. The reduced thermal mass and ability to focus the heating energy permits change of the operating temperature rapidly which improves the products produced. Finally, the shop environment is not heated as significantly from the radiation of the large thermal mass of a conventional press. The shop is a safer and more pleasant environment for the press operators.

In induction heating for consolidating and forming organic matrix composite materials, Boeing generally places a thermoplastic organic matrix composite preform of PEEK or ULTEM, for example, within the metal susceptor envelope (i.e., retort). These thermoplastics have a low concentration of residual volatile solvents and are easy to use. The susceptor face sheets of the retort are inductively heated to heat the preform. Consolidation and forming pressure consolidate and, if applicable, form the preform at its curing temperature. The sealed susceptor sheets form a pressure zone in the retort in a manner analogous to conventional vacuum bag processes for resin consolidation. The retort is placed in an induction heating press on the forming surfaces of dies having the desired shape of the molded composite part. After the retort and preform are inductively heated to the desired elevated temperature, differential pressure (while maintaining the vacuum in the pressure zone around the preform) across the retort which functions as a diaphragm in the press forms the preform against the die into the desired shape of the completed composite panel.

The retort often includes three, stacked susceptor sheets sealed around their periphery to define two pressure zones. The first pressure zone surrounds the composite panel/preform or metal workpiece and is evacuated and maintained under vacuum. The second pressure zone is pressurized (i.e., flooded with gas) at the appropriate time to help form the composite panel or workpiece. The shared wall of the three layer sandwich that defines the two pressure zones acts as the diaphragm.

Boeing can perform a wide range of manufacturing operations in its induction heating press. These operations have optimum operating temperatures ranging from about 350° F. (175° C.) to at least about 1850° F. (1010° C.). For each operation, Boeing usually holds the temperature relatively constant for several minutes to several hours to complete the operations. While temperature can be controlled by controlling the input power fed to the induction coil, a better and simpler way capitalizes on the Curie temperature. Judicious selection of the metal or alloy in the retort's susceptor face sheets avoids excessive heating irrespective of the input power. With improved control and improved temperature uniformity in the workpiece, Boeing produces better products. The method capitalizes on the Curie temperature phenomenon to control the absolute temperature of the workpiece and to obtain substantial thermal uniformity in the workpiece by substantially matching the Curie temperature of the susceptor to the desired temperature of the induction heating operation being performed. This temperature control method is explained in greater detail in U.S. Pat. No. 5,723,849 or 5,728,309.

3. Thermoplastic Welding

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding often requires complicated surface pretreatments.

In contrast, thermoplastic welding, which eliminates fasteners, joins thermoplastic composite components at high speeds with minimum touch labor and little, if any, pretreatments. A conventional welding interlayer tape (compromising the susceptor and surrounding thermoplastic resin either coating the susceptor or sandwiching it) also can simultaneously take the place of shims required in mechanical fastening. As such, composite welding promises to be an affordable joining process. For "welding" a combination of thermoplastic and thermoset composite parts together, the resin that the susceptor melts functions as a hot melt adhesive. If fully realized, thermoplastic-thermoset bonding will further reduce the cost of composite assembly.

There is a large stake in developing a successful induction welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue permits rapid field repair of composites or other structures.

There is little or no loss of bond strength after prolonged exposure to environmental influences.

U.S. Pat. No. 4,673,450 describes a method to spot weld graphite fiber reinforced PEEK composites using a pair of electrodes. After roughening the surfaces of the prefabricated PEEK composites in the region of the bond, Burke placed a PEEK adhesive ply along the bond line, applied a pressure of about 50–100 psig through the electrodes, and heated the embedded graphite fibers by applying a voltage in the range of 20–40 volts at 30–40 amps for approximately 5–10 seconds with the electrodes. Access to both sides of the assembly was required in this process which limited its application.

Prior art disclosing thermoplastic welding with induction heating is illustrated by U.S. Pat. Nos. 3,966,402 and 4,120,712. In these patents, conventional metallic susceptors are used and have a regular pattern of openings of traditional manufacture. Achieving a uniform, controllable temperature in the bond line, which is crucial to preparing a thermoplastic weld of adequate integrity to permit use of welding in aerospace primary structure, is difficult with those conventional susceptors.

Thermoplastic welding is a process for forming a fusion bond between two faying thermoplastic faces of two parts. A fusion bond is created when the thermoplastic on the surface of the two thermoplastic composite parts is heated to the melting or softening point and the two surfaces are brought into contact, so that the molten thermoplastic mixes. The surfaces are held in contact while the thermoplastic cools below the softening temperature.

The same process parameters apply to hot melt thermoplastic adhesive bonds between prefabricated thermoset composite bonds. Simple as the thermoplastic welding process sounds, it is difficult to perform reliably and repeatably in a real factory on full-scale parts to build a large structure such as an airplane wing box. One difficulty is heating the bond line properly without overheating the entire structure. It also is difficult to achieve intimate contact of the faying surfaces of the two parts at the bond line during heating and cooling because of (1) the normal imperfections in the flatness of composite parts, (2) thermal expansion of the thermoplastic during heating to the softening or melting temperature, (3) flow of the thermoplastic out of the bond line under pressure (i.e., squeeze out), and (4) contraction of the thermoplastic in the bond line during cooling.

The exponential decay of the strength of magnetic fields dictates that, in induction welding processes, the susceptible structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some cases, destruction or denaturing of the resin. To avoid overheating of the outer plies and to insure adequate heating of the inner plies, we use a susceptor of significantly higher conductivity than the fibers to peak the heating selectively at the bond line. An electromagnetic induction coil heats a susceptor to melt and cure a thermoplastic resin (also sometimes referred to as an adhesive) to bond the elements of the assembly together.

The current density in the susceptor may be higher at the edges of the susceptor than in the center because of the nonlinearity of the coil, such as occurs when using a cup core induction coil like that described in U.S. Pat. No. 5,313,037. Overheating the edges of the assembly can result in underheating the center, either condition leading to inferior welds because of non-uniform curing. It is necessary to have an open or mesh pattern in the susceptor embedded at the bond line to allow the resin to create the fusion bond between the composite elements of the assembly when the resin heats and melts.

a. Moving coil welding processes

In U.S. Pat. No. 5,500,511, Boeing described a tailored susceptor for approaching the desired temperature uniformity. This susceptor, designed for use with the cup coil of U.S. Pat. No. 5,313,037, relied upon carefully controlling the geometry of openings in the susceptor (both their orientation and their spacing) to distribute the heat evenly. The susceptor had a regular array of anisotropic, diamond shaped openings with a ratio of the length (L) to the width (W) greater than 1. This susceptor produced a superior weld by producing a more uniform temperature than obtainable using a susceptor having a similar array, but one where the L/W ratio was one. Changing the length to width ratio (the aspect ratio) of the diamond-shaped openings in the susceptor produced a large difference in the longitudinal and transverse conductivity in the susceptor, and, thereby, tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, Boeing altered the current density in regions near the edges by increasing the foil density (i.e., the absolute amount of metal). Increasing the foil density along the edge of the susceptor increases the conductivity along the edge and reduces the current density and the edge heating. Boeing increased foil density by folding the susceptor to form edge strips of double thickness or by compressing openings near the edge of an otherwise uniform susceptor. These susceptors were difficult to reproduce reliably. Also, their use forced careful placement and alignment to achieve the desired effect.

The tailored susceptor was designed to use with the cup coil of U.S. Pat. No. 5,313,037, where the magnetic field is strongest near the edges because the central pole creates a null at the center. Therefore, the tailored susceptor was designed to counter the higher field at the edges by accommodating the induced current near the edges. The high longitudinal conductivity encouraged induced currents to flow longitudinally.

The selvaged susceptor for thermoplastic welding which is described in U.S. Pat. No. 5,508,496 controls the current density pattern during eddy current heating by an induction coil to provide substantially uniform heating to a composite assembly and to insure the strength and integrity of the weld in the completed part. This susceptor is particularly desirable for welding ribs between prior welded spars using an asymmetric induction coil (described in U.S. Pat. No. 5,444,220, which we incorporate by reference), because it provides a controllable area of intense, uniform heating under the poles of the coil, a trailing region with essentially no heating, and a leading region with minor preheating.

Boeing achieved better performance (i.e., more uniform heating) in rib welding by using a selvaged susceptor having edge strips without openings. The resulting susceptor, then, has a center portion with a regular pattern of openings and solid foil edges, referred to as selvage edge strips. The susceptor is embedded in a thermoplastic resin to make a susceptor/resin tape that is easy to handle and to use in preforming the composite pieces prior to welding. Also, with a selvaged susceptor, the impedance of the central portion should be anisotropic with a lower transverse impedance than the longitudinal impedance. Here, the L/W ratio of diamond shaped openings should be less than or equal to one. With this selvaged susceptor in the region immediately under the asymmetric induction work coil, current flows across the susceptor to the edges where the current density is lowest and the conductivity, highest.

Generally, the selvaged susceptor is somewhat wider than normal so that the selvage edge strips are not in the bond line. Boeing sometimes removes the selvage edge strips after forming the weld, leaving only a perforated susceptor foil in the weld. This foil has a relatively high open area fraction.

Another difficulty remaining in perfecting the thermoplastic welding process for producing large scale aerospace structures in a production environment involved control of the surface contact of the faying surfaces of the two parts to be welded together. The timing, intensity, and schedule of heat application is controlled so the material at the faying surfaces is brought to and maintained within the proper temperature range for the requisite amount of time for an adequate bond to form. Intimate contact is maintained while the melted or softened material hardens in its bonded condition.

Large scale parts such as wing spars and ribs, and the wing skins that are bonded to the spars and ribs, are typically on the order of 20–30 feet long at present, and potentially as much as 100 feet in length when the process is perfected for commercial transport aircraft. Parts of this magnitude are difficult to produce with perfect flatness. Instead, the typical part will have various combinations of surface deviations from perfect flatness, including large scale waviness in the direction of the major length dimension, twist about the longitudinal axis, dishing or sagging of "I" beam flanges, and small scale surface defects such as asperities and depressions. These irregularities interfere with full surface area contact between the faying surfaces of the two parts and actually result in surface contact only at a few "high points" across the intended bond line. Applying pressure to the parts to force the faying surfaces into contact achieves additional surface contact, but full intimate contact is difficult or impossible to achieve in this way. Applying heat to the interface by electrically heating the susceptor in connection with pressure on the parts tends to flatten the irregularities further, but the time needed to achieve full intimate contact with the use of heat and pressure is excessive, can result in deformation of the top part, and tends to raise the overall temperature of the "I" beam flanges to the softening point, so they begin to yield or sag under the application of the pressure needed to achieve a good bond.

Boeing's multipass thermoplastic welding process described in U.S. Pat. No. 5,486,684 (which we incorporate by reference) enables a moving coil welding process to produce continuous or nearly continuous fusion bonds over the full area of the bond line. The result is high strength welds produced reliably, repeatably, and with consistent quality. This process produces improved low cost, high strength composite assemblies of large scale parts fusion bonded together with consistent quality. It uses a schedule of heat application that maintains the overall temperature of the structure within the limit in which it retains its high strength. Therefore, it does not require internal tooling to support the structure against sagging which otherwise could occur when the bond line is heated above the high strength temperature limit. The process also produces nearly complete bond line area fusion on standard production composite parts having the usual surface imperfections and deviations from perfect flatness. The multipass welding process eliminates fasteners and the expense of drilling holes, inspecting the holes and the fasteners, inspecting the fasteners after installation, sealing between the parts and around the fastener and the holes; reduces mismatch of materials; and eliminates arcing from the fasteners.

In the multipass process, an induction heating work coil is passed multiple times over a bond line while applying pressure in the region of the coil to the components to be welded, and maintaining the pressure until the resin hardens. The resin at the bond line is heated to the softening or melting temperature with each pass of the induction work coil and pressure is exerted to flow the softened/melted resin in the bond line and to reduce the thickness of the bond line. The pressure improves the intimacy of the faying surface contact with each pass to improve continuity of the bond. The total time at the softened or melted condition of the thermoplastic in the faying surfaces is sufficient to attain deep interdiffusion of the polymer chains in the materials of the two faying surfaces throughout the entire length and area of the bond line. The process produces a bond line of improved strength and integrity in the completed part. The total time of the faying surfaces at the melting temperature is divided into separate time segments which allows time for the heat in the interface to dissipate without raising the temperature of the entire structure to the degree at which it loses its strength and begins to sag. The desired shape and size of the final assembly is maintained.

A structural susceptor includes fiber reinforcement within the weld resin to alleviate residual tensile strain otherwise present in an unreinforced weld. This susceptor includes alternating layers of thin film thermoplastic resin sheets and fiber reinforcement (usually woven fiberglass fiber) sandwiching the conventional metal susceptor that is embedded in the resin. While the number of total plies in this structural susceptor is usually not critical, Boeing prefers to use at least two plies of fiber reinforcement on each side of the susceptor. This structural susceptor is described in greater detail in U.S. Pat. No. 5,717,191, which we incorporate by reference.

The structural susceptor permits gap filling between the welded composite laminates which tailors the thickness (number of plies) in the structural susceptor to fill the gaps, thereby eliminating costly profilometry of the faying surfaces and the inherent associated problem of resin depletion at the faying surfaces caused by machining the surfaces to have complementary contours. Standard manufacturing tolerances produce gaps as large as 0.120 inch, which are too wide to create a quality weld using the conventional susceptors.

It is easy to tailor the thickness of the structural susceptor to match the measured gap by scoring through the appropriate number of plies of resin and fiber reinforcement and peeling them off. In doing so, a resin rich layer will be on both faying surfaces and this layer should insure better performance from the weld.

b. Fixed coil induction welding

Thermoplastic welding using Boeing's induction heating workcell differs from the moving coil processes because of the coil design and resulting magnetic field. The fixed coil workcell presents promise for welding at faster cycle times than the moving coil processes because it can heat multiple susceptors simultaneously. The fixed coil can reduce operations to minutes where the moving coil takes hours. The keys to the process, however, are achieving controllable temperatures at the bond line in a reliable and reproducible process that assures quality welds of high bond strength. The fixed coil induces currents to flow in the susceptor differently from the moving coils and covers a larger area. Nevertheless, proper processing parameters permit welding with the induction heating workcell using a susceptor at the bond line.

Another advantage with the fixed coil process is that welding can occur using the same tooling and processing equipment used to consolidate the skin, thereby greatly reducing tooling costs. Finally, the fixed coil heats the entire bond line at one time to eliminate the need for shims that are currently used with the moving coil. To control the temperature and to protect against overheating, "smart" susceptors as a retort or as the bond line susceptor material or both are used.

The need for a susceptor in the bond line poses many obstacles to the preparation of quality parts. The metal which is used because of its high susceptibility differs markedly in physical properties from the resin or fiber reinforcement so dealing with it becomes a significant issue. The reinforced susceptor of overcomes problems with conventional susceptors by including the delicate metal foils (0.10–0.20 inch wide×0.005–0.010 inch thick; preferably 0.10×0.007 inch) in tandem with the warp fibers of the woven reinforcement fabric. The weave fibers hold the foils in place longitudinally in the fabric in electrical isolation from each other yet substantially covering the entire width of the weld surface while still having adequate space for the flow and fusion of the thermoplastic resin. Furthermore, in the bond line, the resin can contact, wet, and bond with the reinforcing fiber rather than being presented with the resinphilic metal of the conventional systems. There will be a resin-fiber interface with only short runs of a resin-metal interface. The short runs are the length of the diameter of two weave fibers plus the spatial gap between the weave fibers, which is quite small. Thus, the metal is shielded within the fabric and a better bond results. In this woven arrangement to foil can assume readily the contour of the reinforcement. Finally, the arrangement permits efficient heat transfer from the foil to the resin in the spatial region where the bond will focus.

The strength and durability of adhesive bonds or thermoplastic welds connecting composite structure is improved, however, by adding Z-pin mechanical reinforcement to the bond line.

4. Z-Pin Reinforcement

First, some general discussion about the benefits of Z-pins.

Composite sandwich structures having resin matrix skins or face sheets adhered to a honeycomb or foam core are used in aerospace, automotive, and marine applications for primary and secondary structure. The face sheets typically are reinforced organic matrix resin composites made from fiberglass, carbon, ceramic, or graphite fibers reinforcing a thermosetting or thermoplastic matrix resin. The face sheets carry the applied loads, and the core transfers the load from one face sheet to the other or absorbs a portion of the applied load. In either case, it is important that all layers of the structure remain rigidly connected to one another. Noise suppression sandwich structure or sandwich structures for other applications are described in U.S. Pat. No. 5,445,861, which we also incorporate by reference.

Keeping the face sheets adhered to the foam is problematic. The most common source of delamination stems from a relatively weak adhesive bond that forms between the face sheets and the foam core. That is, pulloff strength of the face sheets in shear is low. Efforts to strengthen the bond have generally focused on improving the adhesive, but those efforts have had limited success.

Delamination can arise from differences in the coefficient of thermal expansion (CTE) of the different material layers. As a result, as temperatures oscillate, the face sheet or foam may expand or contract more quickly than its adjoining layer. In addition to causing layer separation, CTE differences can significantly distort the shape of a structure, making it difficult to maintain overall dimensional stability. Conventional sandwich structure optimizes the thickness of a structure to meet the weight and/or space limitations of its proposed application. Sandwich structures are desirable because they are usually lighter than solid metal or composite counterparts, but they may be undesirable if they must be larger or thicker to achieve the same structural performance. Providing pass-throughs (i.e., holes), which is relatively easy in a solid metal structure by simply cutting holes in the desired locations, is more difficult in a composite sandwich structure because holes may significantly reduce the load carrying capability of the overall structure.

Foster-Miller has been active in basic Z-pin research. U.S. Pat. No. 5,186,776 describes a technique for placing Z-pins in composite laminates involves heating and softening the laminates with ultrasonic energy with a pin insertion tool which penetrates the laminate, moving fibers in the laminate aside. The pins are inserted either when the insertion tool is withdrawn or through a barrel in the tool prior to its being withdrawn. Cooling yields a pin-reinforced composite. U.S. Pat. No. 4,808,461 describes a structure for localized reinforcement of composite structure including a body of thermally decomposable material that has substantially opposed surfaces, a plurality of Z-pin reinforcing elements captured in the body and arranged generally perpendicular to one body surface. A pressure plate (i.e., a caul plate) on the other opposed body surface drives the Z-pins into the composite structure at the same time the body is heated under pressure and decomposes. We incorporate U.S. Pat. No. 4,808,461 and 5,186,776 by reference.

A need exists for a method to form a sandwich structure that (1) resists distortion and separation between layers, in particular, separation of the face sheets from the core; (2) maintains high structural integrity; (3) resists crack propagation; and (4) easily accommodates the removal of portions of core, as required by specific applications. The method should allow the structure to be easily manufactured and formed into a variety of shapes. In U.S. patent application Ser. No. 08/582,297 (which we incorporate by reference), Childress described such a method of forming a pin-reinforced foam core sandwich structure. Face sheets of uncured fiber-reinforced resin (i.e., prepreg or B-stage thermoset) are placed on opposite sides of a foam core. The core has at least one compressible sublayer and contains a plurality of Z-pins spanning the foam between the face sheets. Childress inserted the Z-pins into the face sheets during autoclave curing of the face sheet resin when a compressible sublayer is crushed and the back pressure applied trough the caul plate or other suitable means drives the Z-pins into one or both of the face sheets to form a pin-reinforced foam core sandwich structure. By removing some of the foam core by dissolving, eroding, melting, drilling, or the like to leave a gap between the face sheets, he produced his corresponding column core structure.

The foam core generally is itself a sandwich that includes a high density foam sublayer, and at least one low density, compressible or crushable foam sublayer. The preferred arrangement includes a first and second low density foam sublayer sandwiching the high density sublayer. The Z-pins are placed throughout the foam core in a regular array normal to the surface or slightly off-normal at an areal density of about 0.375 to 1.50% or higher, as appropriate, extending from the outer surface of the first low density foam sublayer through to the outer surface of the second low density foam sublayer. Expressed another way with respect to the arrangement of the pins, there are 200 or more pin/inch$^2$. Preferably, the foam sublayers are polyimide or polystyrene, the Z-pins are stainless steel or graphite, and the face sheets are fiber-reinforced, partially cured or pre-cured thermosetting or thermoplastic resin composites.

In U.S. patent application Ser. No. 08/235,594, Hoopingarner et al. describe a honeycomb core composite sandwich panel having a surrounding border element (i.e., a "closeout") made of rigid foam board. The two planar faces of the rigid foam board are embossed or scored with a scoring pattern of indentations usually in the form of inter-linked equilateral triangles. The scoring is sufficiently deep numerous to provide escape paths for volatiles generated inside the panel during curing and bonding of the resin in the face sheets to the honeycomb core and peripheral foam. The scoring prevents the development of excessive pressure between the face sheets in the honeycomb core that otherwise would interfere with the bonding. We incorporate this application by reference.

Rorabaugh and Falcone discovered two ways to increase the pulloff strength in foam core sandwich structure. First, they form resin fillets around the fiber/resin interfaces at the contact faces of the foam core by dimpling the foam to create a fillet pocket prior to resin flow during curing. Second, they arrange the pins in an ordered fashion such as a tetrahedral configuration or a hat section configuration. In tetrahedral or hat section configurations, the pins not only provide a tie between the two skins but they also provide miniature structural support suited better for load transfer than normal or random off-normal (interlaced) or less ordered pin configurations. With ordering of the pins, they produce anisotropic properties. More details concerning their Z-pin improvements are available in their U.S. patent application Ser. No. 08/628,879, which we incorporate by reference.

In U.S. patent application Ser. No. 08/658,927, Childress introduced Z-pin mechanical reinforcement to the bond line of two or more composite elements by prefabricating cured composite elements that include protruding Z-pins (or stubble) along the element face that will contact the bond line. The stubble is formed by including peel plys on this face during pin insertion using, for example, the process described in U.S. patent application Ser. No. 08/582,297. When connecting the element to other composite structure, Childress removed the peel plys to expose the stubble. Then, he assembled the several elements in the completed assembly to define the bond line. The problem with this Childress method is that it introduces the Z-pins to the detail parts which forces modification of their manufacturing processes and tools. We make a corresponding structure having a thermoplastic welding susceptor integrated into the faying surface of the detail part in the region of the bond line.

Pannell discovered a method to achieve Z-pin reinforcement using ordinary detail parts. Described in U.S. patent application Ser. No. 08/660,060 (which we incorporate by reference), Pannell use precured Z-pin strips to produce the reinforced joining of prefabricated composite detail parts in adhesive bonding, cocuring, or thermoplastic welding processes. The strips have pin stubble projecting on opposed faces. The strips eliminate the need to incorporate the stubble into the detail parts, which would be difficult with manufacturing operations like resin transfer molding (RTM) or fiber placement. The strips are compatible with all major joining processes, are easy to manufacture, are easy to store, and have lasting shelf-life. They can be used with our integrated susceptor detail parts.

Pannell's strips are easy to prepare using a press that includes a silicone lay-up surface instead of the hard surfaces normally used in pin insertion operations in the prior art. The silicone allows controlled penetration of the pins. Once the strips are formed, because the resin is cured, the strips are easy to store without refrigeration or other protection until used in combination with conventional detail parts to fabricate joined composite assemblies.

The thin, flexible strips simplify the placement of the bond and allow the bond line location to be determined in a determinant assembly operation at the time the detail parts are arranged in the assembly jig. The strip bends to assume the shape of the bond line and can fit a complex curvature. As such, the strips eliminate the need for precise placement of pins in the already expensive, precision detail parts. The ability to define the bond line at the time of assembly using precured parts also greatly simplifies the assembly process over competing processes that require the use of uncured parts.

Following assembly, Childress and Pannell complete the bonding, cocuring or welding using conventional joining techniques. If the stubble is backed by a foam core sandwich structure of the type Childress described in U.S. patent application Ser. No. 08/582,297, the connecting operation might compress or decompose a low density sublayer in the foam to drive the Z-pins deeper into the contacted element along the bond line.

Assemblies having Z-pin mechanical reinforcement are better able to withstand impact shock without peel failure.

The pin insertion processes that Foster-Miller uses or that Childress or Pannell suggest for their research efforts into Z-pin reinforced composites pose two important problems for production scale up. First, by having the foam almost directly on the part separated by only soft thin materials, when the pins penetrate these layers, the resin flows through the holes and saturates the foam and cloth. When you try to peel the foam off, or rather if you can peel the foam off without a secondary machining process, many pins adhere to the breather/foam layers and are pulled out of the laminate. Pulling the pins out creates a loss of control as to the arrangement of pins left in the part, and to the height of each pin.

Second, the foam functions as the guide bushing and is supposed to introduce the pins perpendicular to the plies in the laminate. However, the foam is soft. When the pins hit a fiber in the panel, they take the path of least resistance and go around the fiber. Since the foam offers little support, the pins move instead of the fibers, so they end up being pushed into the panel at various angles. Loss of control occurs as to pin orientation and insertion depth.

Accurately positioning the susceptor at the bond line is difficult, especially for bond lines between complexly curved parts. Therefore, in a fashion analogous to Childress's adding Z-pins to the detail parts along the faying surfaces, we have discovered how to include a susceptor on this surface with or without Z-pins. Alternatively, we can make a Pannell precured strip having a susceptor mesh integrated on one or both of the opposed surfaces. With our integrated susceptor detail parts, we simplify the assembly of complex composite assemblies because the susceptor is carried with one or more of the detail parts.

We can make our detail parts with exposed Z-pins like the Childress detail parts using Avila's pin insertion machine. That machine is described in greater detail in U.S. patent application Ser. No. 08/657,859, which we incorporate by reference.

Accurately positioning the susceptor at the bond line remains a problem especially if the bond line forms a complex curvature. By integrating the susceptor into the detail, we fix its relationship to one of the details and know precisely where it will be located relative to the induction coil.

SUMMARY OF THE INVENTION

We incorporate a thermoplastic welding susceptor into a detail part or precured strip for alignment along the faying surfaces defining the bond line to simplify alignment of parts prior to welding. With the susceptor incorporated into the detail part, assembly (especially of complexly curved assemblies) avoids tricky and difficult positioning of a separate, conventional susceptor.

We incorporate the susceptor into the detail part by:
 (a) applying a sheet of thermoplastic resin on a prefabricated part or prepreg layup to make the surface resin rich in the location of the intended bond line;
 (b) overlaying a susceptor on the thermoplastic sheet; and
 (c) curing the assembly under suitable heat and pressure to form the detail with the desired, integral bond line susceptor in a resin rich zone.

RTM manufacture is possible for making these integrated susceptor detail parts.

We prepare welded or bonded composite assemblies using the integrated susceptor detail parts. The integrated susceptors are compatible with Z-pin reinforcement in the weld and with moving coil or fixed coil heating processes or even with resistance heating processes.

Integrating the susceptor onto the faying surface of the detail part fixes its location spatially. Doing so, simplifies the welding of complex curvatures, because the susceptor is accurately secured at a predetermined location as a feature of the detail part. With the part-to-part location of the susceptor identified, it is easier to plan for Z-pin reinforcement in the weld and to automate the welding process. Not only are there fewer parts, but alignments greatly simplified, since the relative position of the susceptor to one detail part is fixed.

BRIEF DESCRIPTION OF THE DRAWINGS

FIG. 3 is a schematic cross-sectional view of the induction heating workcell adapted for thermoplastic welding of a wingskin/spar assembly.

FIG. 4 is another schematic cross-sectional view of the workcell of FIG. 3 rotated 90° from the view in FIG. 3.

FIG. 21 is a schematic sectional view of Avila's pin insertion tool.

FIG. 24 is a schematic exploded view of a detail part of the present invention having an integrated susceptor along the bond line surface.

FIG. 25 is schematic isometric, partially cutaway, showing a transverse flux induction head that we used to prepare lap shear welded test articles.

FIG. 26 is a schematic elevation showing one typical welding operation for joining a skin and spar.

FIG. 27 is a schematic isometric showing an interconnecting spar/skin assembly having welded joints in accordance with the processes of the present invention.

DETAILED DESCRIPTION OF A PREFERRED EMBODIMENT

First, some discussion about thermoplastic welding using Boeing's induction heating press before focusing on the integrated susceptor detail part of the present invention. We can use this press both to manufacture the detail parts or to join such parts into welded assemblies.

1. The Induction Heating Press

Figure 1:
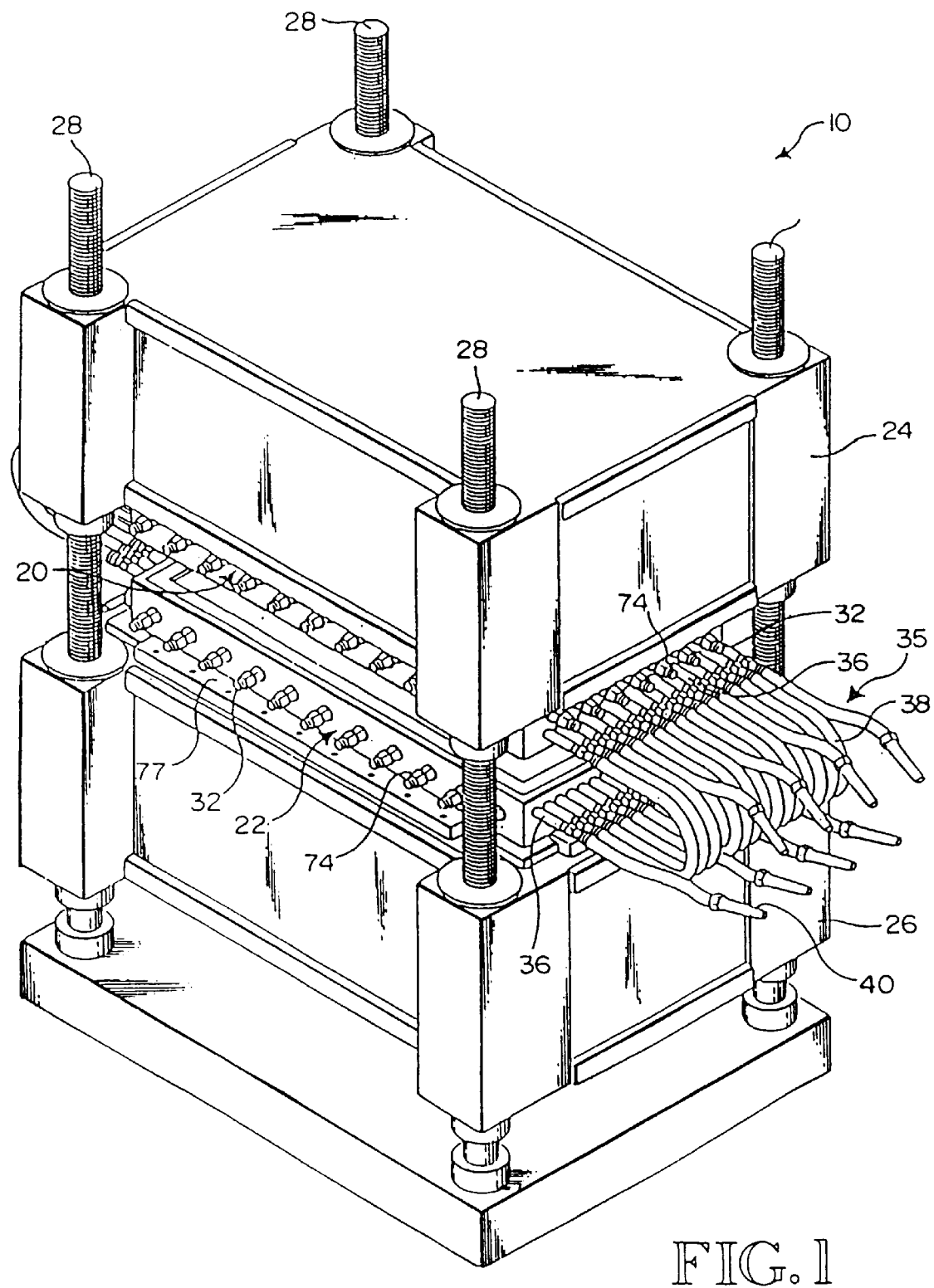
FIG. 1 is a perspective view of Boeing's induction heating workcell.

In FIG. 1, an induction heating workcell 10 includes tools or dies 20 and 22 mounted within an upper 24 and a lower 26 strongback. The strongbacks are each threaded onto four threaded column supports or jackscrews 28 or they float free on the columns and are fixed with nuts. We can turn the jackscrews to move one strongback relative to the other. The strongbacks 24 and 26 provide a rigid, flat backing surface for the upper and lower dies 20 and 22 to prevent the dies from bending and cracking during manufacturing operations. Preferably, the strongbacks hold the dies to a surface tolerance of ±0.003 in/ft$^2$ of the forming surface. Such tolerances are desirable to achieve proper part tolerances. The strongbacks may be steel, aluminum, or any other material capable of handling the loads present during forming or consolidation, but we prefer materials that are nonmagnetic to avoid any distortion to the magnetic field that our induction coils produce. In some circumstances, the dies may be strong enough themselves that strongbacks are unnecessary. The strongbacks transfer pressure input through the columns evenly to the dies.

The dies 20 and 22 are usually ceramic and are reinforced with a plurality of fiberglass rods 32 that are held with bolts 74 and that extend both longitudinally and transversely in a grid through each die. Each die usually is framed with phenolic reinforcement 72 as well to maintain a compressive load on the die. Each die may be attached to its strongback by any suitable fastening device such as bolting or clamping. In the preferred embodiment, both dies are mounted on support plates 76 which are held in place on the respective strongbacks through the use of clamping bars 77. The clamping bars 77 extend around the periphery of the support plates 76 and are bolted to the respective strongbacks through the use of fasteners (not shown).

The dies should not be susceptible to inductive heating so that heating is localized in the retort rather than distributed in the press as well. The ceramic has a low coefficient of thermal expansion, good thermal shock resistance, and relatively high compression strength, such as a castable fused silica ceramic.

Boeing embeds portions of an induction coil 35 in the dies. In the illustrated embodiment, we use four separate induction segments overlie the top and bottom of the workpiece, but the number can vary, as shown in FIG. 3, and the segments can surround all sides of the workpiece. The segments shown in FIG. 3 are formed from a straight tubing section 36 that extends along the length of each die and a flexible coil connector 38 that joins the straight tubing sections 36 in the upper die 20 to the corresponding straight tubing section in the lower die 22. Other arrangements might be used with the intent to create a known, controllable magnetic field suitable for the welding operation. Connectors 40 located at the ends of the induction coil 35 connect the induction coil 35 to an external power source or coil driver 50 and to a coolant source. While illustrated as a circular tube, the cross-section is arbitrary. We often use rectangular channels for the induction segments.

Cavities 42 and 44 in the respective dies hold tool inserts 46 and 48. The upper tool insert 46 in some applications has a contoured forming surface 58 that has a shape corresponding to the desired shape of the outer mold line surface of the completed composite. The lower tool insert determines the inner mold line. The tool inserts also should not be susceptible to inductive heating, preferably being formed of a castable ceramic. In some cases, both the dies and the tool inserts can be made from a matrix resin rather than from a ceramic. Using a resin, however, limits use of the tooling to low temperature operations, such as forming or consolidating certain organic matrix composites. Boeing prefers ceramic tooling which provides the greatest flexibility and versatility for the induction heating workcell.

Figure 2:
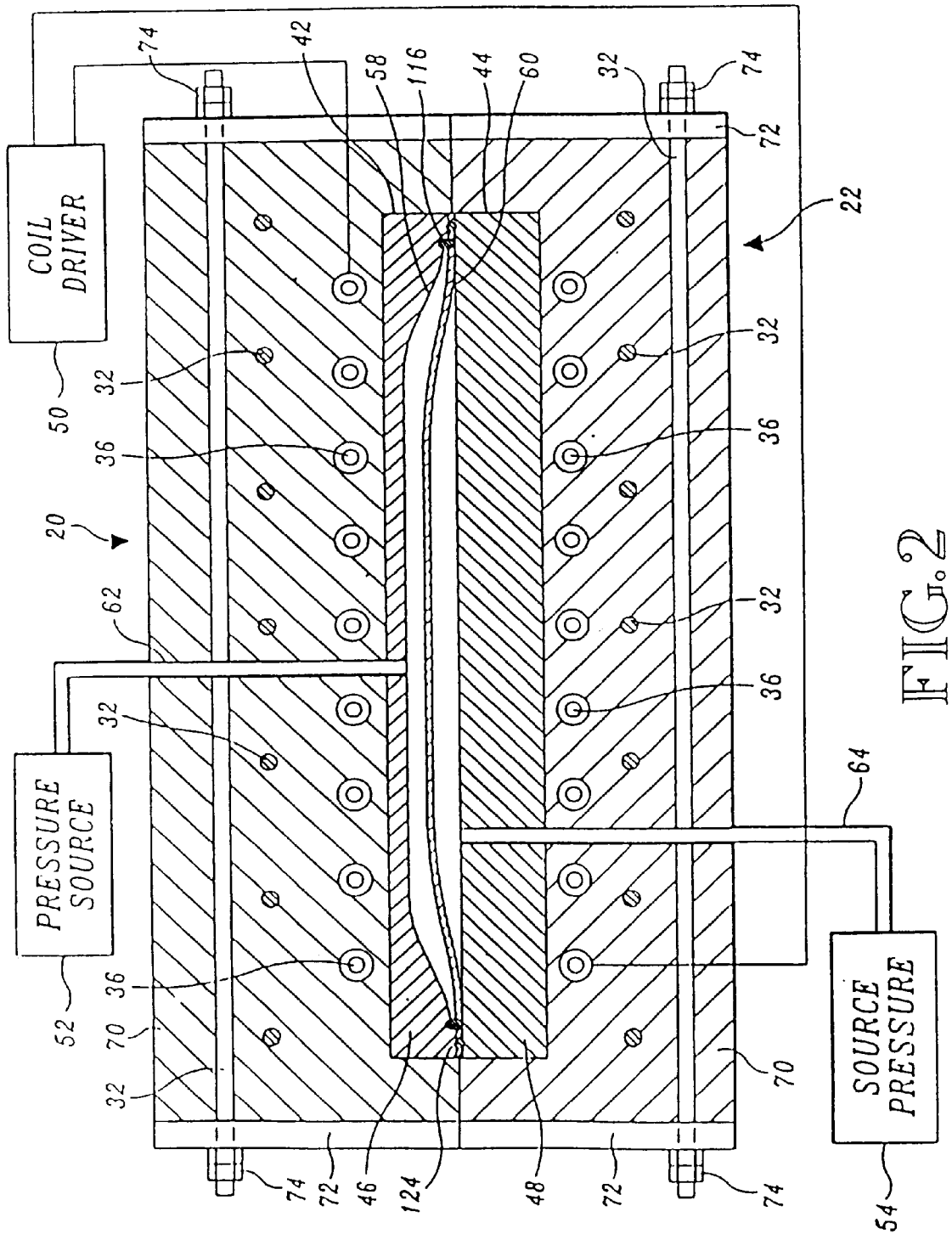
FIG. 2 is a schematic cross-sectional view of the induction heating workcell of FIG. 1.

While the forming surfaces can be an integral part of the dies, we prefer the separate die and tool insert configuration shown in FIG. 2 because changing tool inserts to make different parts is easier and quicker (because they are significantly smaller) and the overall tooling costs are reduced.

Each die surrounds and supports the respective tool insert and holds the straight sections 36 of the induction coil in proper position in relationship to the tool insert 46 or 48. In the preferred embodiment, the interior 70 of the dies is formed of a castable phenolic or ceramic and the exterior sides from precast composite phenolic resin blocks 72. In some applications, with chopped fibers or nonwoven or woven reinforcing mats reinforce the phenolic or ceramic.

FIG. 2 shows a retort 60 between the tool inserts 46 and 48. The retort 60 includes an organic matrix composite panel or metal workpiece and sandwiching susceptor face sheets. The retort is heated to a forming or consolidation temperature by energizing the coil 35. In the case of a composite panel, when the panel reaches the consolidation temperature at which the matrix resin flows, we apply gas pressure to the outer surfaces of the retort by pressure sources 52 and 54. Pressure source 52 applies pressure to the upper surface of the retort 60 through a conduit 62 that passes through the upper die 20 and upper tool insert 46, while pressure source 54 applies a pressure to the lower surface of the retort 60 through a conduit 64 that passes through the lower die 22 and lower tool insert 48. The pressure applied to the retort 60 is maintained until the retort has formed to the contour of the forming surface 58 and the matrix resin has consolidated. The pressure sources 52 and 54 generally apply a differential pressure to the retort 60. We do not use a retort in the present invention.

An alternating oscillating electrical current in the induction coil 35 produces a time varying magnetic field that heats the susceptor sheets of the retort via eddy current heating. The frequency at which the coil driver 50 drives the coils 35 depends upon the nature of the retort 60. We power the coil with up to about 400 kW at frequencies of between about 3–10 kHz. Current penetration of copper at 3 kHz is approximately 0.06 inches (1.5 mm), while penetration at 10 kHz is approximately 0.03 inches (0.75 mm).

The tool inserts and dies are usually substantially thermally insulating and trap and contain heat within the retort. Since the dies and tool inserts are not inductively heated and act as insulators to maintain heat within the retort, the present invention requires far less energy to achieve the desired operating temperature than conventional autoclave or resistive hot press methods where the metal tooling is a massive heat sink.

The operations using Boeing's fixed coil workcell are faster than prior art operations because it does not heat the large thermal mass of either the dies or tool inserts. The retort is heated, the tool is not. Thus, the necessary processing temperature is achieved more rapidly. In addition, the highly conductive materials in the retort provide rapid heat transfer to the workpiece. When the driver 50 is de-energized, the dies and the retort cool rapidly to a temperature at which we can remove the retort from the workcell, saving time and energy over conventional systems. Coolant flowing through the coil tubes functions as an active heat exchanger to transfer heat out of the workpiece, retort, and dies. In addition, the thermal cycle is not as limited by the heating and cooling cycle of the equipment and tools allowing better tailoring of the thermocycle better to the process for which we are using the induction heating workcell.

A more complete description of the press is provided in U.S. Pat. Nos. 5,723,849 and 5,641,422, which we incorporate by reference.

2. Thermoplastic Welding

As shown in FIGS. 3 & 4, Boeing has made several changes to its induction heating workcell to adapt it to perform bond line thermoplastic welding. First, because the assemblies of primary interest are wingskin/spar combinations and because the parts in these combinations are prefabricated so that the welding operation need only focus upon melting the thermoplastic while applying modest pressure to facilitate the fusion, Boeing creates a cavity within its dieset to contain the wingskin/spar combinations. The cavity is substantially a cube or similar rectangular solid with canted edges and has major surfaces (i.e., the top and bottom) complementary to the contour of the wing assembly. The induction coil segments extend longitudinally in the same direction as the spars and underlie the major and canted surfaces as shown in FIG. 3. The skins 100 and spars 105 are assembled in the center of the cavity sandwiched between, optionally, silicone rubber pressure pads 110 that assure substantially uniform pressure distribution over the wingskin surfaces irrespective of surface features or irregularities. A susceptor tape 115 is positioned along the bond line between the wingskin 100 and the spar caps. By a "susceptor tape" we mean a metal ribbon embedded in thermoplastic resin, a structural susceptor as described in U.S. Pat. No. 5,717,191 having the resin-embedded ribbon sandwiched with alternating plies of thermoplastic film and fiber reinforcement to alleviate residual tensile strain in the weld and to simplify gap filling while ensuring a resin rich, quality weld, or a reinforced susceptor as described in U.S. Pat. No. 5,723,849. The metal ribbon may be copper, a nickel-cobalt alloy, a nickel-iron alloy, a cobalt-iron alloy, or any other suitable "smart" susceptor from the alternatives discussed in U.S. Pat. No. 5,728,309. The susceptor might be narrow metal strips about 0.10–0.20 inch wide held in side-by-side array with the thermoplastic resin or woven with carbon fibers or other reinforcement. The induction coil induces eddy currents that run longitudinally. Therefore, the susceptor should have a lower longitudinal impedance to promote longitudinal current flow. We might use a modified, selvaged susceptor (see U.S. Pat. No. 5,508,496) having solid copper bands alternating with mesh sections with the solid bands in the bond line rather than falling outside it, since they are the primary current carriers. We would integrate the susceptor tape into one face of the detail parts forming the assembly, when using the process of the present invention.

A "susceptor tape," however, still suffers from a relatively low bond strength because the metal susceptor is asked to function as the equivalent of a reinforcing fiber. The matrix resin, however, does not wet with the metal as well as it does with the reinforcing fibers and the metal does not have the strength commonly available with the fibers. Therefore, a reinforced susceptor promises improved bond strength.

Figure 5:
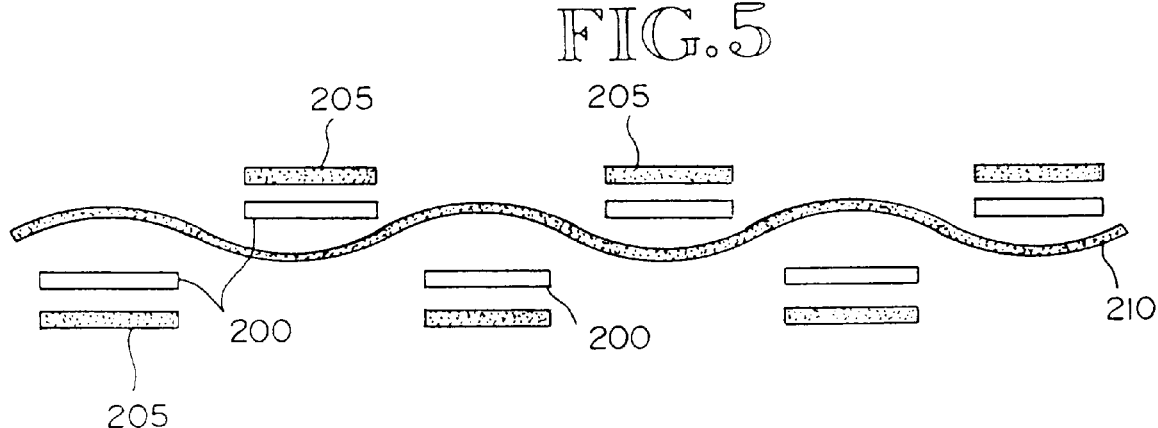
FIG. 5 is a schematic sectional view of a reinforced susceptor.

The need for a susceptor in the bond line poses many obstacles to the preparation of quality parts. The metal which is used because of its high susceptibility differs markedly in physical properties from the resin or fiber reinforcement so dealing with it becomes a significant issue. The reinforced susceptor (FIG. 5) overcomes problems with conventional susceptors by including the delicate metal foils 200 (0.10–0.20 inch wide×0.005–0.010 inch thick; preferably 0.10×0.007 inch) in tandem with the warp fibers 205 of the woven reinforcement fabric. The weave fibers 210 hold the warp fibers 205 and foils 200 in place longitudinally in the fabric in electrical isolation from each other yet substantially covering the entire width of the weld surface while still having adequate space for the flow and fusion of the thermoplastic resin. Furthermore, in the bond line, the resin can contact, wet, and bond with the reinforcing fiber rather than being presented with the resinphilic metal of the conventional systems. There will be a resin-fiber interface with only short runs of a resin-metal interface. The short runs are the length of the diameter of two weave fibers plus the spatial gap between the weave fibers, which is quite small. Thus, the metal is shielded within the fabric and a better bond results. In this woven arrangement to foil can assume readily the contour of the reinforcement. Finally, the arrangement permits efficient heat transfer from the foil to the resin in the spatial region where the bond will form. The reinforced susceptor might be an analog of the structural, selvaged, or tailored susceptors of one other application (i.e. a tape encased in resin and placed along the bond line) or may be fabricated as part of the facing plys of the prefabricated composites that abut along the bond line.

Figure 6:
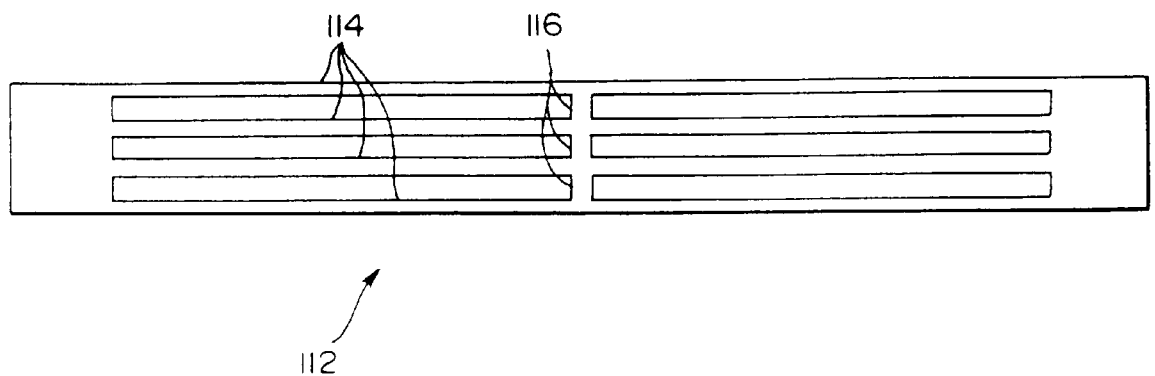
FIG. 6 is a plan view of a multistrip susceptor that is weavable into the fabric to form the reinforced susceptor.

The foil in the susceptor may be in the form of a multistrip susceptor 112 as shown in FIG. 6. The foil includes two or more parallel strips 114 that extend the full length of the strip. The foil is usually about 0.007 inch thick and each strip is about 0.10–0.20 inch wide. The strips are separated by gaps of comparable width or slightly wider dimension which we etch or ablate from a solid foil. Along the length of the susceptor, we periodically use transverse spacer strips 1 16 to span the gap and to retain the carrier strips 114 apart. While shown as four strips wide, the foil can be virtually any width. It can be about two - four inches wide to match the spar cap width or might even be the full width of sheets of the composite prepreg used to form the skins. Dimensions given are typical and could be varied.

As shown in FIG. 4, the susceptors for the top and bottom are connected together into a loop circuit with jumpers 115 at the ends of the spars 105. The jumpers 115 allow the current which the magnetic field induces to flow around the assembly to generate heat in the bond lines.

With the wingskin/spar combination assembled on the pressure pads in the cavity, we close the dies and energize the coil 35 using a frequency of about 3–10 kHz to produce about 400 kW. This energy produces an oscillating magnetic field around the assembly (which preferably is aligned with the central axis of the coil) that rapidly heats the susceptors to the desired welding temperature. We prefer to use a "smart" susceptor made from a nickel-iron alloy as discussed in U.S. Pat. No. 5,728,309, which will assure that we do not overheat the bond line as well as assuring a substantially uniform temperature in the bond line during the fusion period when the thermoplastic resin is melted. As shown in FIG. 3, we simultaneously make the six welds (one weld on each spar cap of the three spars), which greatly reduces processing time. The welding process is quite fast taking about 25–30 minutes including heating to the melt, holding the temperature during the weld fusion, and cooling. Throughout the process, we maintain a pressure of about 30–50 psig along the bond line. The weight of the assembly may make the pressure slightly higher on the bottom than the top but this pressure difference should be insignificant to the quality of the weld and the performance of the completed part.

The welding process might cause the combination to sag when the bond line reaches the melt temperature where the flow needed for focusing the fusion bond occurs. Therefore, it may be necessary to support the assembly from the inside. Boeing's preferred support concept is described in U.S. Pat. No. 5,710,414 and involves using high temperature silicone rubber balloons or other inflatable devices to fill the spaces defined by the assembled skins and spars. Other tooling might also be used, such as filling the space with salt or another material that we can later dissolve, including ceramics. If support tooling is used, the part design must be such that the support tooling can be removed after the welds are formed. In this case, for example, the combination cannot have completely closed cavities. It generally will not because ribs are omitted from the assembled combination, since welding ribs transverse to the magnetic field is troublesome. The need to remove the support tooling can severely impact the parts we can fabricate.

The integrity of the weld is critical to the performance of the completed, welded structure. The quality of the weld is related to the temperature along the bond line and good welds require control of the temperature within a relatively narrow range during the welding. We particularly want to avoid overheating, so a "smart" susceptor made from a Co, Ni, or Fe alloy with a Curie temperature slightly above the melting temperature of the resin will help ensure that we produce quality welds. By "slightly above" we mean within about 50–70° F. above the melting point of Tg for the resin in the processing window for the resin where a weld will form but the resin will not denature or pyrolyze and the composite will not delaminate. Furthermore, an alloy like Invar 42 (42% Ni-58% Fe) has a coefficient of thermal expansion (CTE) comparable to the resin composite so that embedding the susceptor into the completed part will not have as dramatic an impact if the susceptor is such an alloy rather than copper or another metal where the CTE mismatch between the resin and susceptor is larger.

Suitable thermoplastic resins include polyimides, PEEK, PEK, PEKK, PES, PPS, TORLON (i.e. PEI), or the like. It is especially suited, however, for consolidation or forming of resins that have low volatiles content and that are nonreactive (i.e., the true thermoplastics like PEEK or ULTEM).

The surface of an aircraft wing skin must be maintained to a close tolerance to achieve an efficient aerodynamic surface. The tolerances of the inner mold line surface of the wing skin must also be maintained at a close tolerance at least in a buildup area where the wing skin will be joined to a spar to ensure that the wing skin and spar can be precisely joined. It is not as critical, however, to control the inner mold line surface in areas where the wing skin is not attached to other structures. The composite panel has additional plies to define the buildup areas. The additional reinforcement of the composite panel in these areas which is necessary where a spar will be attached, and provide a convenient way to match the skin and spar to produce the desired outer wing configuration even if the spars are imprecise in their dimensions. We can fabricate built up areas at the faying surfaces to provide the precision fit, in this way we can eliminate shims.

In conventional thermoplastic welding, the susceptor is a separate element and may be in sheet, mesh, expanded, milled, selvaged or other suitable form. The susceptor should be structured for the optimum conductivity longitudinally and transversely needed to obtain controlled, reliable, and reproducible heating. Geometry and structure are closely related to the type of induction head used, as those of ordinary skill will understand. In the present invention, we simply integrate the conventional susceptor into the detail part along the bond line. Integrated, the susceptor still needs to have all the favorable properties of the conventional, separate susceptor.

While we prefer to align the longitudinal metal foil strips in the susceptor with the coil segments, other orientations between the strips and coil might be used, and such orientations are undoubtedly necessary to use if we elect to simultaneously weld ribs, spars, and closeouts.

Next, we will discuss the benefits achievable with Z-pins across the bond line, since an integrated susceptor design is compatible with Z-pinning.

3. Z-Pin Reinforcement

Z-pin bonding produces stronger bonds between composite detail parts than are achievable with adhesive bonds or fusion (i.e., welded) bonds. Z-pin bonding adds Z-direction reinforcement to the otherwise unreinforced joint in the organic matrix resin. The Z-pins mechanically reinforce the bond, especially in environments prone to vibration. Z-pins are beneficial at the joints between detail parts in adhesive bonding, cocuring, or welding processes to join two or more precured parts or a combination of precured and uncured detail parts.

Figure 14:
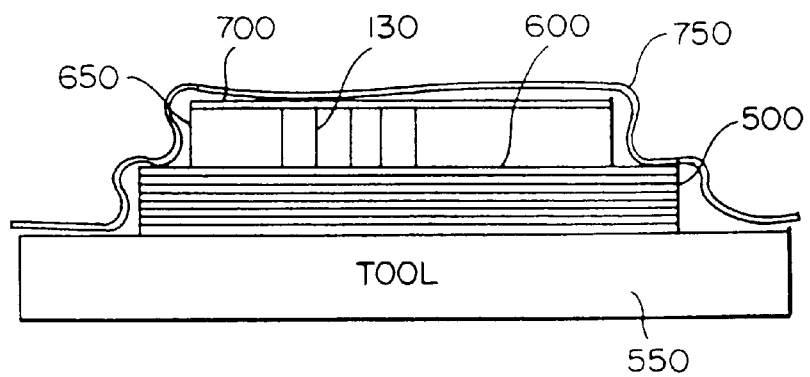
FIGS. 14–16 illustrate the process for making a stubbled composite detail part.
Figure 15:
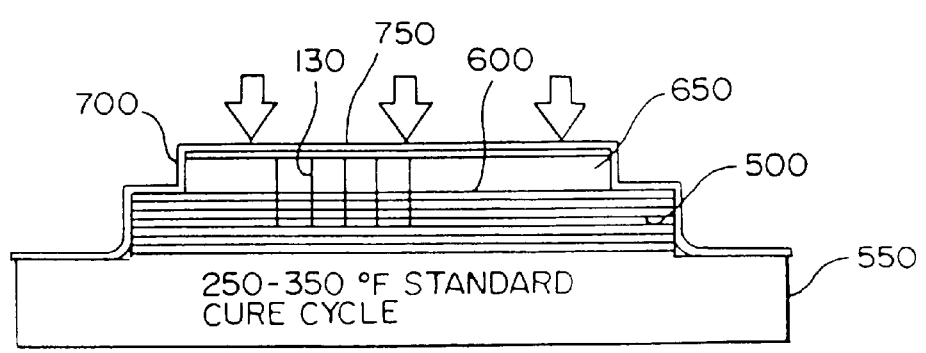
Figure 16:
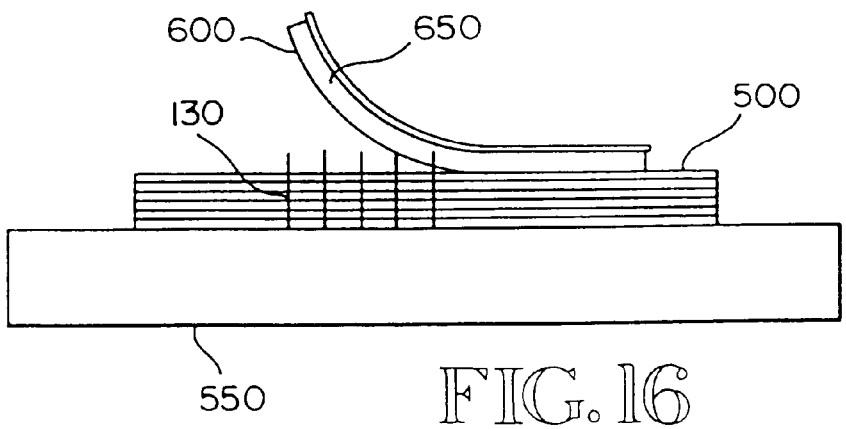

In the Z-pin bonding process, Pannell prepared a precured composite that has Z-pins (or "stubble") protruding from the detail along the intended bond line. To insert the pins in their intended location, he uses an insertion process like one of those described in U.S. patent application Ser. Nos. 08/618, 650 or 08/582,297 or any other suitable insertion process. This basic approach is shown in FIG. 14–16. Pannell can also use Avila's pin insertion tool (FIG. 15). Before describing the pin insertion process in detail, we will first describe how to use the Z-pinned detail parts to prepare bonded assemblies.

Throughout this discussion, we use "composite" to mean a fiber reinforced organic resin matrix material. The fibers should be of suitable strength to make aerospace structural parts, such as graphite, fiberglass, or carbon fibers. The organic resin can be a thermosetting resin, such as epoxy or bismaleimide, or a thermoplastic, such as ULTEM or KIIIB polyimide. Z-pinning is compatible with all fiber and resin systems.

The function and properties of the Z-pins are described in copending U.S. patent application Ser. Nos. 08/618,650; 08/582,297; 08/658,927; and 08/660,060 which we incorporated by reference earlier. In Z-pin bonding, the resins should be compatible with the intended joint. The Z-pins might be the same material as the reinforcing fibers in the composite detail parts or can be different, as the situation dictates.

Figure 7:
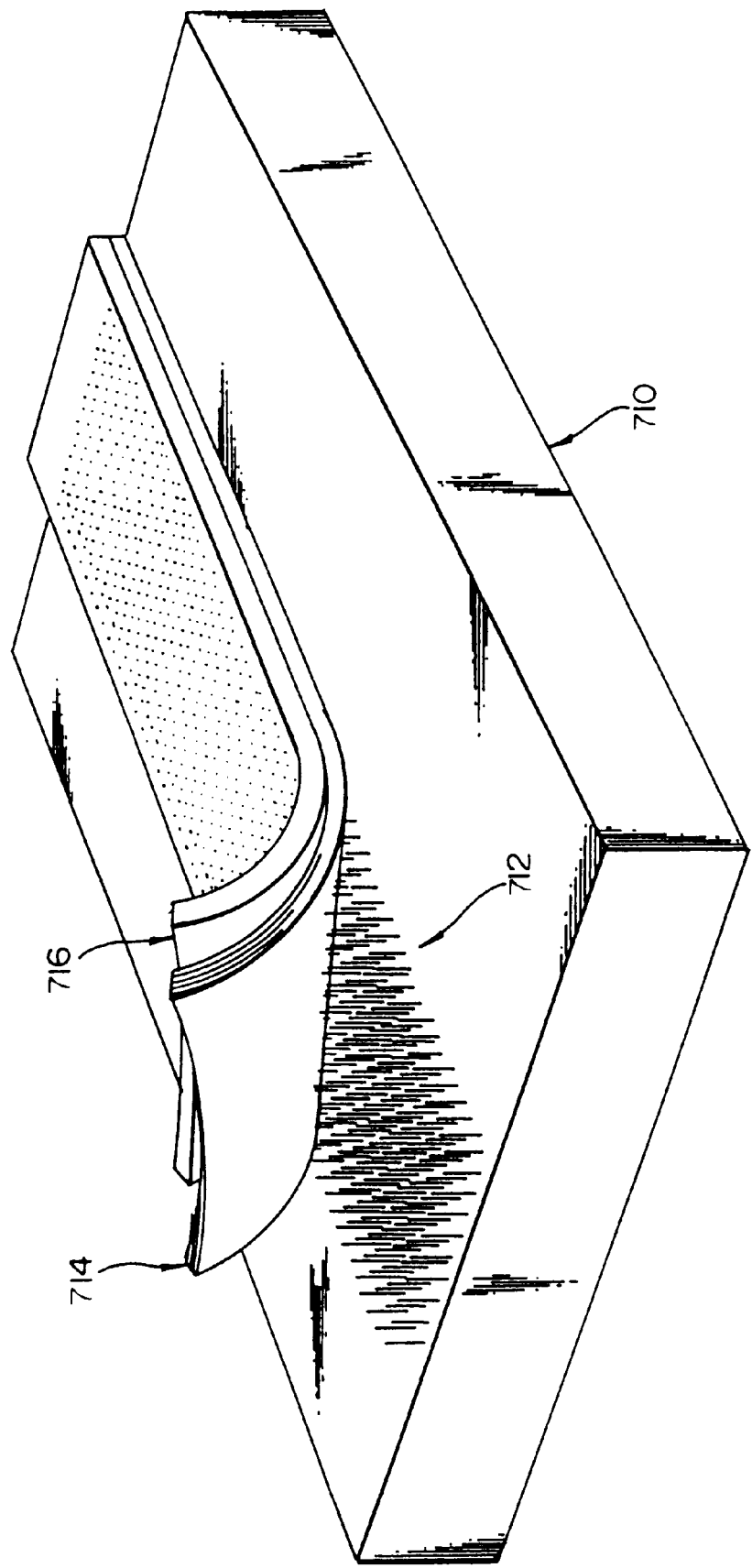
FIG. 7 is a schematic isometric showing the method for forming a composite detail part having Z-pin reinforcement stubble along a bond line.

Now turning to FIG. 7, the Z-pin bonding process uses a composite detail part 710 having a region 712 of Z-pin stubble along the intended bond line for connecting part 710 with other detail parts. Each Z-pin generally protrudes about $\frac{1}{16}$ inch above the surface of part 710 (like the Indian "bed of nails") for ultimate insertion into the facing parts at the joint, but the height can change with the intended application. To protect the stubble during manufacture and inventory prior to laying up the assembly for bonding, we cover the stubble with Teflon peel plys 714 and the residue of the pin-carrier foam 716 which we use to hold the pins prior to their insertion into the detail part 710.

In some applications, especially with a decomposable foam, it may be unnecessary to use a peel ply 714. The peel ply 714 functions to protect the Z-pin stubble during storage while leaving a clean surface in the stubble region when peeled away during the lay up process, and can be any suitable material.

The pins in the stubble 712 may be normal to the surface of part 710 or interlaced or highly ordered, as described in Boeing's U.S. patent application Ser. Nos. 08/618,650 and 08/628,879. That is, the pins can assume any desired arrangement. The density of pins is also variable to suit the application. Differences in the orientation of pins, their length, their strength, their density, etc. can change in different regions of the bond line. That is, the areal density of pins might be 1.0% on the left side of the part in FIG. 7 while being 1.5% on the right side. Alternately, the pin density might be higher around fasteners or might be higher near the edges of the bond line as opposed to along the centerline. Also, of course, the orientation may change at different regions along the bond line and orientations might even be mixed together, if desired.

By "orientation," we mean normal, interlaced, highly ordered, or the like as defined in Boeing's copending Z-pinning applications. For clarity in the drawings in the present application, we simply illustrate the "normal" orientation.

The pin-carrying foam 716 is described in greater detail in the copending applications and prior art patents that we earlier incorporated by reference.

The composite detail part 710 can be a laminate of plys of fiber reinforced organic resin matrix material, or might be a sandwich panel with a foam, honeycomb or other core, or might even be column core. Basically, part 710 can be any material that has a resin interface for bonding to another detail part. We reinforce the joint between the resin and the other part at their interface.

The height to which the stubble of pins extends can vary widely to suit the intended application. Of course, the strength, shape, size, and orientation of the pins effect their effectiveness when the protrusion height gets large.

Figure 8:
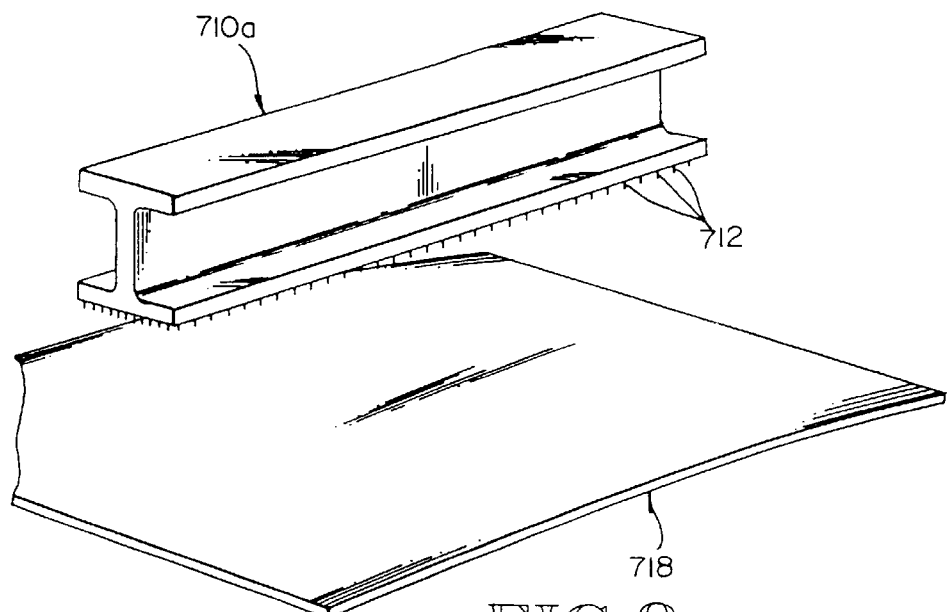
FIG. 8 is a schematic isometric showing layup of a stubbled I-beam spar in contact with an uncured skin panel.

As shown in FIG. 8, the detail part 710a might be fabricated as an I-beam spar rather than as a panel. In fact, the detail part can assume any shape so long as the shape is susceptible of Z-pin insertion to create the reinforcing stubble along the bond line.

FIG. 8 illustrates placing the spar detail part 710a on an uncured panel 818 with the stubble 712 at the interface. FIG. 3 illustrates a typical cross-section of the spar-panel assembly. While the stubble 712 is shown on the spar in FIG. 8, the Z-pins could be on either the spar, the panel or both detail parts.

Figure 9:
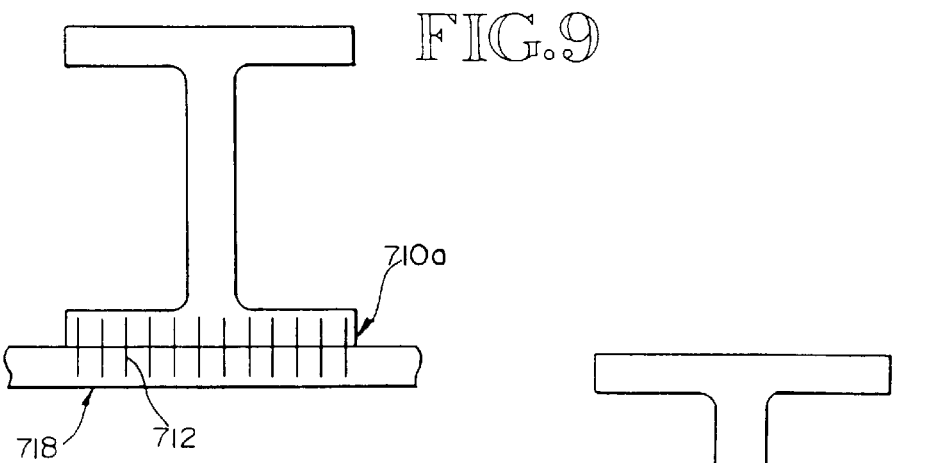
FIG. 9 is a schematic sectional view of the spar/panel assembly of FIG. 8 illustrating the reinforced bond line.
Figure 11:
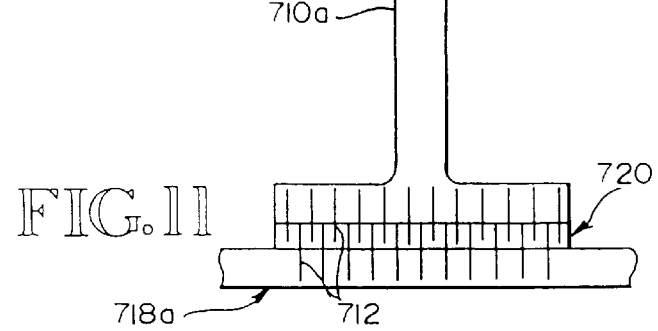
FIG. 11 is a schematic sectional view illustrating the bond line of an assembly made in accordance with FIG. 10.
Figure 10:
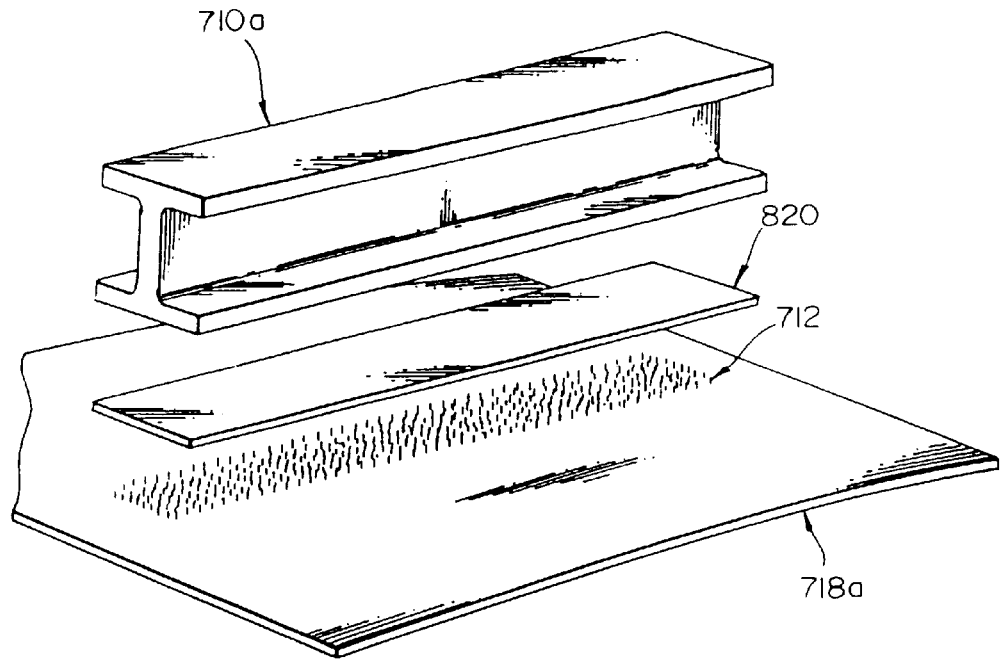
FIG. 10 is another schematic isometric illustrating layup of a stubbled spar to a cured skin with an intermediate padup layer along the bond line.

As shown in FIG. 9, when the assembly of the spar 70a and panel 818 are bonded, the Z-pins in the stubble 712 penetrate into the uncured panel 818. In the circumstance where the panel 818a is precured, as shown in FIG. 10 and 11, we introduce a bond padup strip 820, typically of the same materials as the detail parts being joined. The padup strip 820 is uncured during assembly and functions to bond the precured, thermoset detail parts when the bonding process is complete. The padup strip can be an uncured thermosetting resin prepreg (in which cases bonding is a cocuring process) or might be any suitable adhesive bonding material. The padup strip might be a resin encased susceptor of the type shown in FIGS. 19 & 20 and as Boeing uses in its thermoplastic welding operations. In this case, the detail parts would generally be precured.

As best shown in FIG. 11, the spar detail part 710a includes a stubble surface so that the padup strip 820 ends up having pins extending upwardly from the panel 18a as well as downwardly from the spar flange 10a. Shawn Pannell describes in his U.S. patent application Ser. No. 08/660,060, that the pins might be carried in the padup strip with stubble on both faces with longer, integral pins if the detail parts are thermoplastic rather than inserting the pins into the spar and panel prior to their curing. We can use Pannell's strips in conjunction with our integrated susceptor detail parts to add Z-pin reinforcement or we can simply include pins in the Childress design with our detail parts.

Figure 12:
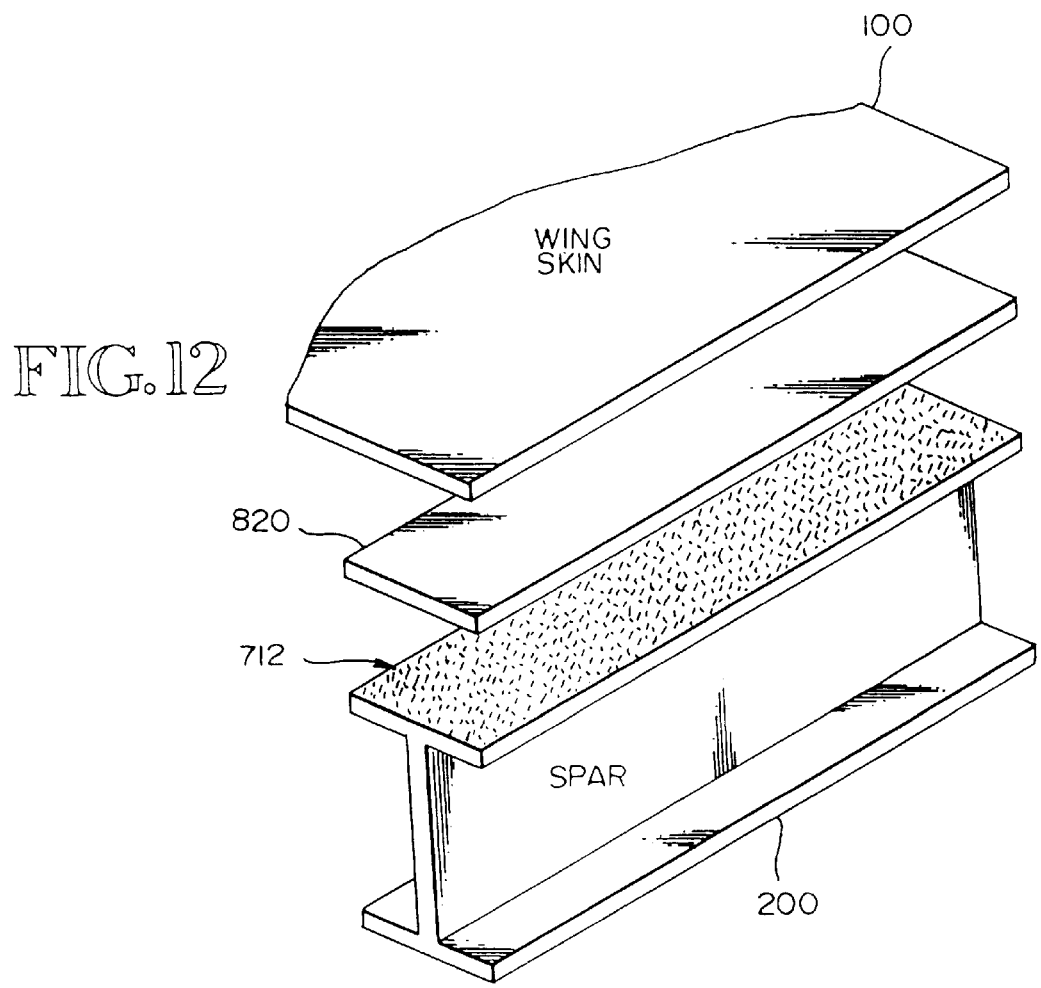
FIG. 12 is another schematic isometric illustrating layup of another stubbled spar to a cured skin.
Figure 13:
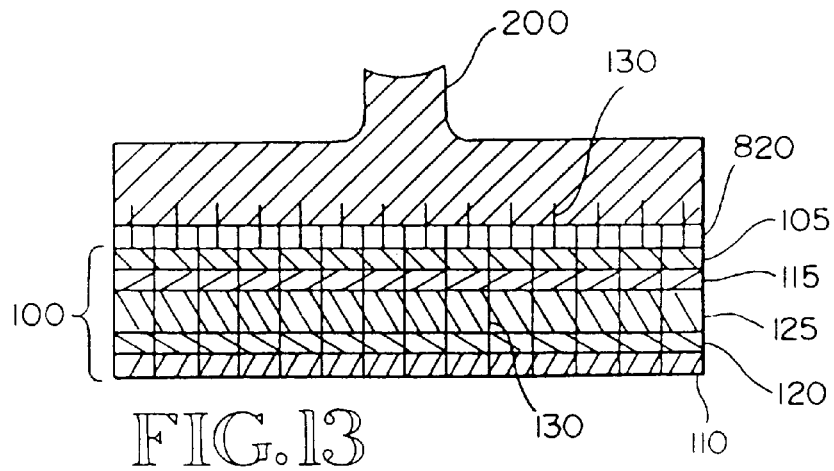
FIG. 13 is a schematic sectional view illustrating the bond line of an assembly made in accordance with FIG. 12, showing the sandwich structure on the skin permitting deeper penetration of the Z-pin reinforcement into the spar.

FIG. 12 and 13 illustrate another embodiment of the present invention with reference to the bonding of a wing skin to a spar. FIG. 6 shows an exploded view of the wing skin 100, padup strip 20, and spar 200 while FIG. 7 shows a typical cross-section taken along the bond line. While FIG. 6 & 7 illustrate a wing skin-spar joint, the process is applicable to any joint. This embodiment describes bonding using a sandwich core structure for the wing skin to produce the stubble region and subsequent bonding of the skin to the spar with an uncured padup strip in a cocure, adhesive bonding, or welding operation.

As best shown in FIG. 13, the skin 100 comprises a sandwich core structure of the type described in U.S. patent application Ser. No. 08/582,297 having outer face sheets 105 & 110, crushable foam layers 115 and 120, and a central foam core 125 with Z-pins 130 extending through all five layers. Stubble on the interface surface is achieved by crushing layers 1 15 and 120 more than the combined thickness of face sheets 105 and 110 during the autoclave cycle when the pins are inserted into the face sheets. Of course, after curing, the central foam 115, 120 and 125 might be dissolved to make a column core skin structure.

The face sheets 105 & 110 are positioned adjacent the foam core 115, 120 and 125. We usually use a layer of adhesive to attach adjoining layers. We form the pin-reinforced foam core using known methods (e.g., stitching or needling) or purchase it from companies such as Foster-Miller, Inc., in Waltham, Mass. We can score the foam core according to the Hoopingarner method to provide channels for venting of volatiles during curing.

The core generally is a closed cell foam that includes three sublayers: a high density central sublayer 125 and first and second low density, crushable foam sublayers 115 and 120 located on each side of the high density foam sublayer. While three layers are shown, the foam core may be composed of any number of sublayers depending on the particular application. For example, the foam core may be a single low density sublayer; or, it may be a stack of alternating low density and high density sublayers. The foam core should be crushable during autoclave curing to permit the pins to extend into the face sheets. Low density polyimide (e.g., Rohacel™) or low density polystyrene (e.g., Styrofoam™) foams are the presently preferred low density sublayer materials, since they are easy to form and do not require extremely high temperatures or pressures to crush during autoclave curing. The low density sublayer may decompose at the autoclave temperatures.

If a high density sublayer 125 is included, it usually should be made of a material that will not crush during autoclave curing. Obviously, the precise temperatures and pressures to be used during autoclave curing will affect the selection of the material used to form the high density sublayer. Further considerations to be taksublayer materi when selecting an appropriate high density sublayer material include whether the high density sublayer is to be removed after autoclave processing and the preferred method for removing it. Typically it is high density polystyrene or polyimide foam. It might be (i) syntactic foam having internal reinforcing spheres, (ii) a fiber-reinforced resin prepreg or composite, (iii) a fiberform or microform ceramic such as described in U.S. Pat. Nos. 5,376,598; 5,441,682; and 5,041,321 or in copending U.S. patent applications Ser. No. 08/209,847 or 08/460,788, (iv) a metal foil, (v) a metal foil resin laminate of the type described in U.S. Pat. No. 4,489,123 or U.S. patent application Ser. No. 08/585,304, or (vi) a foam filled honeycomb core. The central sublayer 125 might also be a honeycomb core with the cells arranged normal to the plane of the face sheets. As Hoopingarner suggests, the core might be a combination of these alternatives, like a central honeycomb core bordered by a foam closeout frame. If the high density sublayer is a prepreg or a composite, the product itself is a laminated composite. In such case, generally the resin in the face sheets would be the same as the resin in the high density sublayer.

The Z-pins 130 (here and in all the embodiments) may be any suitably rigid material, e.g., stainless steel, titanium, copper, graphite, epoxy, composite, glass, carbon, etc. The Young's modules of elasticity for the Z-pins is generally greater than $10^7$. Additionally, the Z-pins may be barbed, where appropriate, to increase their holding strength in the face sheets.

In the case of thermosets, the face sheets are preferably formed of a partially cured (B-stage) fiber-reinforced composite material. If composites are used as face sheets, the effect that the autoclave cure cycle will have on the face sheets needs to be considered to determine and, then, to follow the optimal temperature/pressure autoclave cure regime.

Suitable reinforcing fibers include glass, graphite, amide, ceramic, and the like. Suitable resins include epoxy, bismaleimide, polyimide, phenolic, or the like. (Virtually any thermoplastic or thermoset resin will suffice.)

Various procedures are available for laying up the composite face sheets. Since such procedures are generally known to those skilled in the arts they are not described here. Although thick, metal sheets do not work well as face sheets, we can use metal foil or metal foil/resin laminated composites. The metal foil in such cases might be welded to metallic Z-pins in the fashion described in U.S. patent application Ser. No. 08/619,957.

The stubbled skin is bonded to a stubbled spar with a padup strip in the process previously described.

FIG. 14–16 illustrate a preferred process for inserting the Z-pins into a detail part to leave a stubble interface. The detail part 500 (here a laminated panel having several layers of prepreg) is mounted on a work surface or layup mandrel 550 with appropriate release films between the part and tool.

Another release film 600 caps the detail part 500 and separates the part 500 from a Z-pin preform 650 (i.e., a foam loaded with Z-pins 130 in a predetermined orientation). A rigid caul plate or backing tool 700 completes the assembly. All the layers are then wrapped in a conventional vacuum bag film 750 which is sealed to permit drawing a suction within the closed volume surrounding the assembly.

As shown in FIG. 15, in an autoclave under elevated temperature and pressure, the foam in the Z-pin preform 650 crushes and the Z-pins 130 are driven into the uncured detail part 500. After completing the cure cycle, the detail part 500 is cured and has the Z-pins 130 anchored within it. The crushed foam 650 and release ply 600 protect the stubble until assembly of the detail parts is desired. Thus, the process of FIG. 14–16 yields a cured detail part having a stubble field. Other processes can be used to achieve the same result, including ultrasonic insertion into precured thermoplastic laminates as described in the prior art or Boeing's other, copending Z-pin applications.

Figure 17:
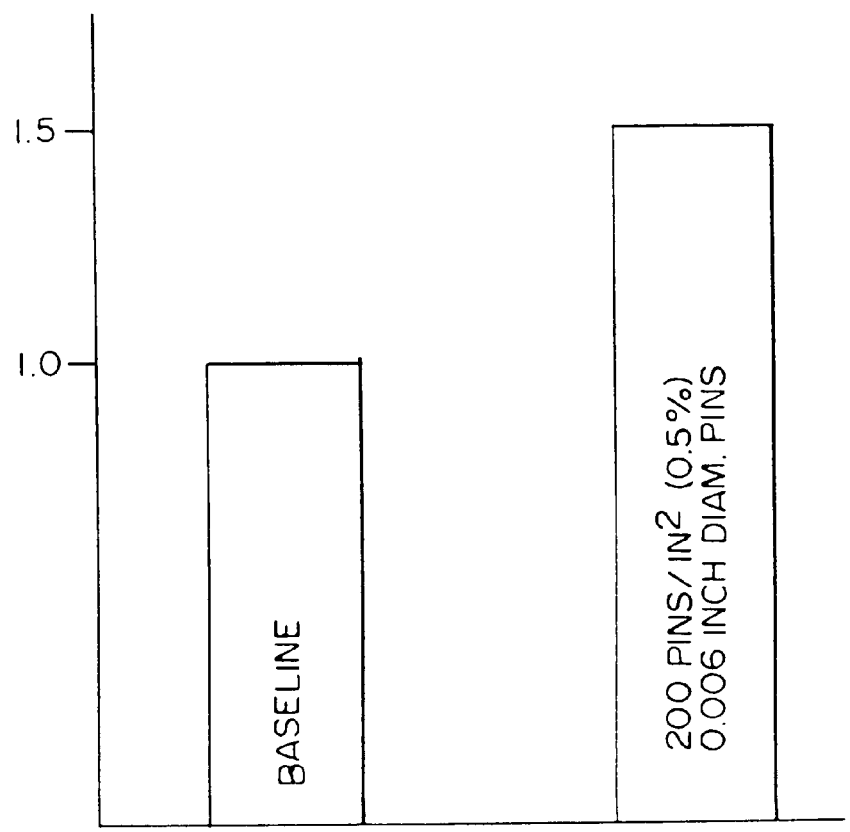
FIG. 17 is a chart showing the improvement in compression after impact strength for Z-pin reinforced structure.

As shown in FIG. 17, including Z-pin reinforcement in the joint improves compression after impact strength of the assembly. Boeing tests show about a 50% increase when using an areal density of 0.5% of 0.006 inch diameter pins in AS4-3501-6 test specimens following a 20 ft-lb impact. The joint nominally has the same compression and tensile strength prior to impact, but the inclusion of pins increase the compression ultimate strength when the assembly is subjected to low speed impact energy. In fact, the strain remains essentially constant over the range of impacts less than the impact needed to observe surface damage.

The following examples further illustrate Boeing's Z-pin experiments.

EXAMPLE 1

Childress made ³⁄₁₆ inch quasi-isotropic composite test specimens from AS4/3501-6 having 0.5% areal density, 16 mil diameter T300/3501-6 Z-pins with sufficient surface peel plys to yield 0.080 inch stubble. As a control, one-half of the specimens did not insert Z-pins. He assembled two of the stubbled parts around an AS4/3501-6 uncured scrim padup about 0.090 inch thick with the stubble from each part overlapping. He bonded the assembled parts using the conventional bonding cycle. Then, he cut the resulting bonded assembly into 1×10 inch coupons, thereby having some pin-reinforced, bonded coupons and some coupons lacking pin reinforcement.

Boeing tested the specimens in the $G_{1c}$ Mode 1 fatigue test cycle with pull tabs glued to the faces pulled in a standard $G_{1c}$ test fixture, and included a crack starter initiating peel in the bond area. The correlated data with the standard load v. head extension (in-lbs/in) is summarized in Table 1:

TABLE 1

| Specimen | | Load | Comments |
| --- | --- | --- | --- |
| Pinned: | 1 | 5.4 | |
| | 2 | 4.8 | |
| | 3 | 2.86 | *Failed in the laminate above the bond line |
| Unpinned: | 4 | 2.75 | |
| | 5 | 3.64 | |
| | 6 | 3.49 | |

Ignoring specimen 3, the Z-pin reinforcement at this relatively low density improved the bond strength with this Mode 1 fatigue measure by about a 45% increase in the peel strength. Upon analysis of the pinned specimens, Childress discovered that some pins were bent, which he believes lowered the reinforcing value (reduced the measured load). Boeing also believes that it could prepare even better bonds (i.e., joints) using higher pressure during the bonding cycle.

EXAMPLE 2

Childress prepared additional specimens using AS4/3501-6 prepreg with 2% by area 0.020 diameter titanium Z-pins inserted into a spar cap. He cured the spar at 350° F. with Z-pin stubble left exposed on the spar cap. The Z-pin stubble was 0.20 inches long. This cured spar was then placed on an uncured skin laminate 0.30 inches thick, with the Z-pin stubble placed against the uncured skin.

The spar, associated spar tooling, and skin were then vacuum bagged and autoclave cured at 350° F. using a 100 psig autoclave pressure. The vacuum and autoclave pressure drove the spar down onto the uncured skin and inserted the Z-pin stubble into the skin. The cured final part was then trimmed for pull testing.

Figure 18:
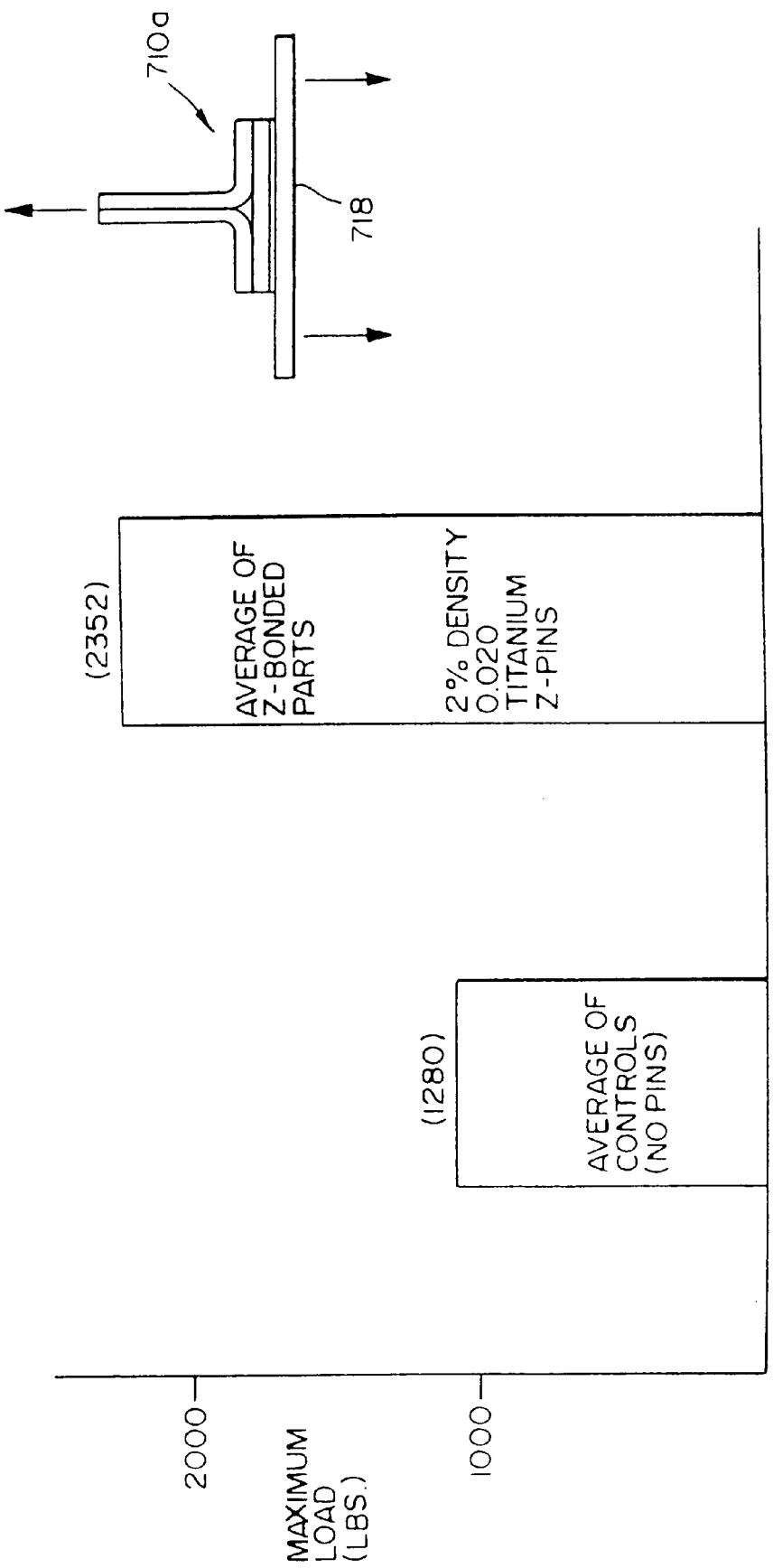
FIG. 18 is another chart showing the improvement in T-stiffener pull-off strength resulting from Z-pin reinforcement.

Pull testing results showed the Z-bonded parts had an 83 percent greater load carrying capability than the control parts. The results are summarized in FIG. 18.

In a thermoplastic welding process, the padup strip 820 might include a susceptor for integrating with an oscillating magnetic field to generate eddy currents sufficient to melt and cure the bond line resins and to form a weld. This strip could have the susceptor adjacent one surface so that the strip would be the analog of one of our integrated susceptor detail part, albeit a thin one. Generally, however, the susceptor would be centrally located in the strip in which case there would be little benefit from the susceptor's in our detail parts if the method of heating involved induction. Of course, if the part carried an integral susceptor and the strip included a susceptor, for welding in the fixed coil induction heating press, a lop circuit could be fashioned by adding jumpers between the part and strip. Also, the multiple susceptors might be suited for resistance heating. Boeing prefers to reduce the amount of metal at the bond line so we prefer a single susceptor design.

Figure 19:
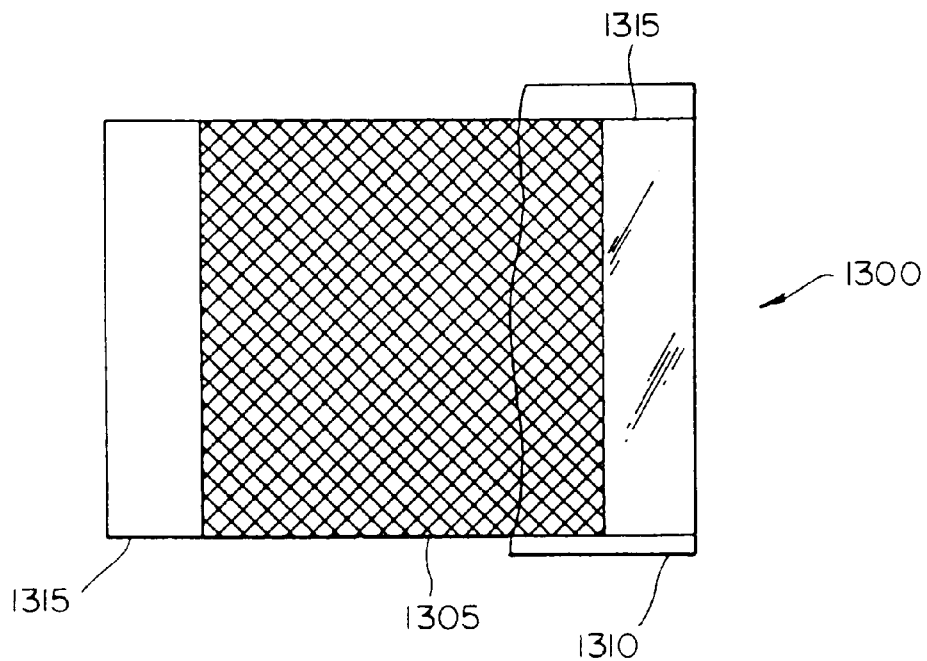
FIG. 19 is a schematic showing a padup strip that incorporates a susceptor.
Figure 20:
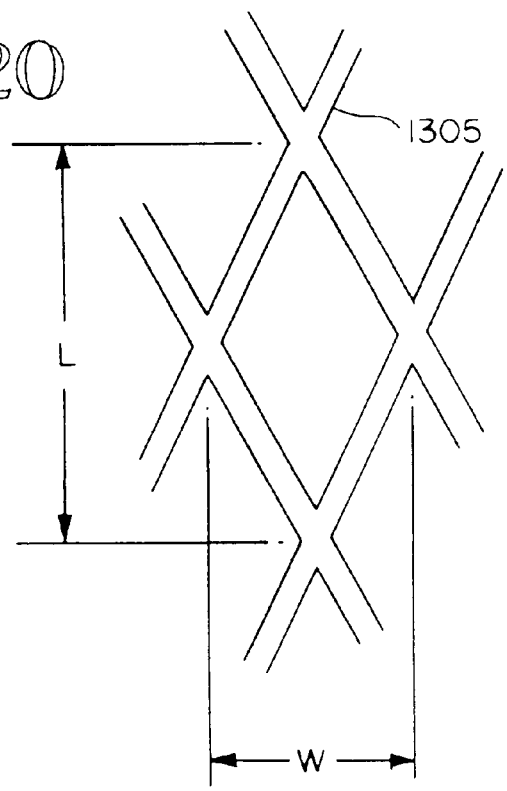
FIG. 20 is a detail showing the mesh of the susceptor of FIG. 19.

We can use any other arrangement to get the appropriate heating at the bond line when completing the weld. If welding, we prefer to use pins in the detail parts that penetrate further into the parts than the region which softens during the formation of a fusion bond between the details. In this way, the pins stay firmly anchored in their desired orientation. A suitable padup strip is illustrated in FIG. 19. We can heat the bond line with induction or resistance heating produced in susceptor. Any of Boeing's susceptors might be used. Energy can be introduced for heating to the susceptor by induction, resistance, a combination of both, or any other suitable means.

As shown in FIG. 19, the susceptor 1300 typically comprises a metal mesh 1305 encased in a resin 1310. The susceptor of FIG. 19 includes selvage edge strips 1315. The mesh 1305 includes a repeating pattern of diamond shaped openings of length (L) and width (W) separated by fine-line elements.

Figure 22:
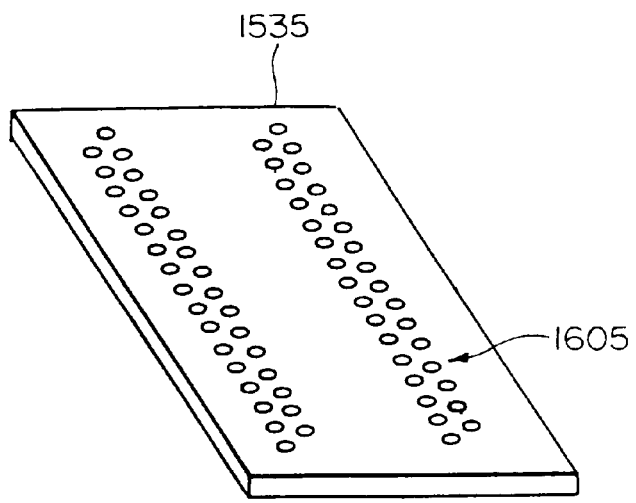
FIG. 22 is a schematic isometric of a cure tool insert used in the insertion tool of FIG. 21.
Figure 23:
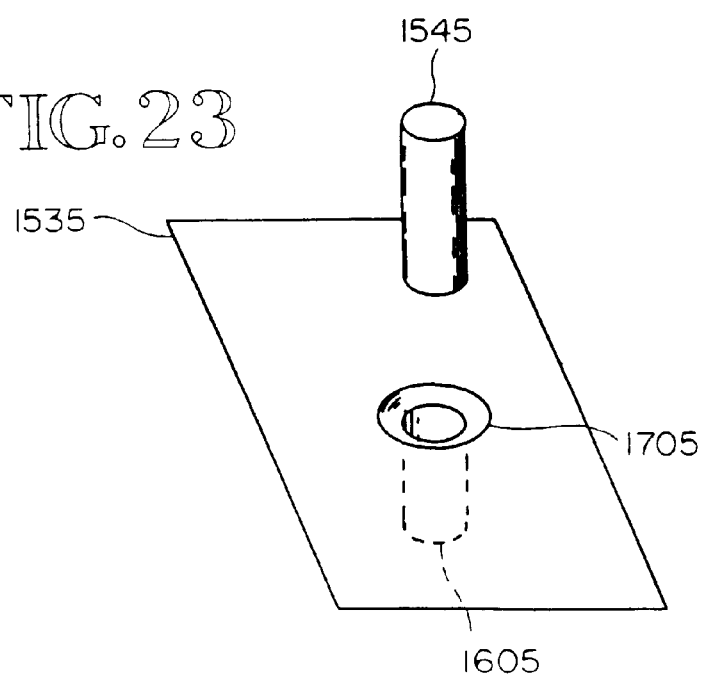
FIG. 23 is a schematic isometric of a pin interfacing and registering with a hole in the cure tool insert of FIG. 22.

FIGS. 21–23 illustrate Avila's pin insertion tool that we can use to form detail parts having pin stubble. Avila's tool 1500 incudes a housing 1505 holding a sliding piston 1510 which is reciprocal between a loading position for receiving a pin-carrying foam 1550 in a cavity 1515 and an insertion position where the piston moves upwardly to crush the foam and to insert the pins 1545. Seals 1520 permit the piston 1510 to slide along the walls of housing 1505 when pneumatic pressure is applied through inlet 1525 to chamber 1530 behind the piston. Motion of the piston 1510 toward removable cure tool 1535 is arrested with stop 1540 which also serves to control the depth of insertion of pins 1545 in the pin-carrying foam 1550 into the detail part 1555. The stop 1540 contacts replaceable stop 1560 that seats in the fixed support frame of the cure tool 1535 that is rigidly attached to the housing 1505 as the fixed wall defining cavity 1515. The replaceable stop allows adjustment of the depth of penetration of the pins into the detail part 1555. The cure tool 1535 fits rigidly in a matching receiving surface in the frame and does not move when piston 1510 moves upwardly. Yet, cure tool 1535 is replaceable to permit controlled insertion of different Z-pin orientations or different insertion depths into the detail part 1555. During pin insertion through movement of the piston 1510, the detail part 1555 is held rigidly on the surface of the cure tool 1535 so that the Z-pins 1545 are positioned correctly.

All parts of the pin insertion tool 1500 are designed to withstand the temperatures and pressures associated with autoclave curing of the resin composite detail parts. Any necessary release films can be used between the pin-carrying foam 1550 or the detail part 1555 and the working parts of Avila's insertion tool.

As the piston 1510 moves upwardly to compress the pin-carrying foam 1550 against the cure tool 1535, the Z-pins 1545 in the foam register with an associated hole 1605 (FIGS. 16 or 17) in the cure tool 1535. To assure registration between the pin 1545 and hole 1605, each hole has a funnel nozzle 1705 to guide the pin into the hole and into its proper orientation in the detail part.

The cure tool has the arrangement of holes that corresponds with the desired Z-pin orientation in the detail part. The tool helps placing the pins accurately. Because the foam decomposes at the autoclave curing temperature, without Avila's tool, the pins lose their lateral support and can move or buckle to disturb the desired pin orientation, especially when the stubble field in the detail part covers a large area. For further assurance of proper pin placement, the contact face of piston 1510 might be knurled to keep the pins from sliding.

Avila's tool might include a shearing ram on the contact surface between the cure tool and the detail part or at the interface between the cure tool and the pincarrying foam for cutting the pins after their insertion. In the alternative where the ram is at the cure tool-foam interface, the width of the cure tool becomes a reliable gauge for setting the height of the stubble, since this much of the pins will protrude when the detail part is removed from the tool.

Avila's pin insertion tool is especially beneficial when making relatively large production runs of detail parts. The tool reduces part-to-part variation by inserting the Z-pins accurately and repeatedly where they are designed to be. Avila's tool is described in greater detail in U.S. patent application Ser. No. 08/657,859, which we incorporated by reference.

For combining the integrated susceptor and Z-pins we might simply apply a metal foil which the pins pierced on insertion to yield a patterned susceptor. We suspect, however, that it would be difficult to obtain controlled heating of this piertrced susceptor reliably from part to part and configuration to configuration. Therefore, we prefer to position the pins in the pre-existing openings of the expanded foil. The susceptor might be fashioned as Kirkwood et al. suggested in U.S. patent application Ser. No. 08/486,560 as a "barbed wire" analog. Alternatively, the susceptor might be of the reinforced design woven and aligned with the associated fiber in the reinforcing fabric. Then, the fibers will protect the delicate foil when the pins are inserted.

4. An Integrated Susceptor

Now turning to the integrated susceptor of the present invention as shown in FIG. 25, we bond the susceptor 2405 to the detail part 2410 along the bond line using an intermediate thermoplastic film 2415 to produce a detail part analogous to the Childress Z-pinned detail part. In fact, in a single step, we can integrate the susceptor and Z-pin the detail part. In this case, the stubble field would overlay the susceptor 2405.

The susceptor typically is a 5 mil thick copper foil, but it may be tailored, selvaged, "smart," reinforced, structural, or any other susceptor configuration described in Boeing's patents and patent applications. The intended application for the detail part and its method of final assembly factor into the decision on the appropriate susceptor. While our focus is primarily with induction thermoplastic welding, the susceptor can be heated resistively or by any other effective method. While FIG. 24 shows the susceptor 2405 over the entire surface of the part, typically the susceptor will be adhered in only a small portion of the surface corresponding essentially to the are of the bond lines. If the entire surface is covered, of course, definition of the bond line can wait until the detail parts are assembled, but precise identification of the bond line with a narrow susceptor is the approach we prefer. Placing the susceptor at a fixed location on the faying surface of the detail makes it easier to accurately locate the susceptor at the bond line interface because the susceptor is tied to one of the interfacing detail parts. Accurate placement is important, especially for the induction process, because the time-varying magnetic field that the coils generate induces uneven heating if the coil and susceptor are misaligned. This problem of alignment is discussed in greater detail in U.S. patent application Ser. No. 08/564,566, which we incorporate by reference. Also, integrating the susceptor with the detail part protects the delicate foil against damage, helps us to assemble complex curvatures, and lends itself to process automation by reducing part count and positioning dexterity.

We can prepare the integrated susceptor while laying up the detail part in fiber placement or prepreg manufacturing operations or can add the susceptor to a prefabricated detail part. When working with prepregs, at the intended location of the bond line, we add a thermoplastic film to the prepreg surface to make the surface resin rich. Then, we overlay the susceptor on the thermoplastic film. We consolidate and cure the preform in conventional autoclave operations to prefabricate the integrated susceptor detail part. In resin transfer molding, we position the film and susceptor or simply the susceptor in the appropriate place in the mold before injecting the resin around the fiber preform.

For prefabricated detail parts, we prepare the surface of the part in the intended location of the susceptor with an alcohol wipe. Then, we position the thermoplastic film 2415 and susceptor 2405 in the same manner as we did for the prepreg manufacture. We tack the film and susceptor in place with KAPTON high temperature tape and place the preform in a heated oven to melt the thermoplastic film. When the preform is heated appropriately, we remove the hot part from the oven and press the susceptor to consolidate the susceptor and thermoplastic film with the prefabricated detail.

The film 2415 assures us of a resin rich surface at the weld. We might add reinforcing fiber to the film or over the film or in the bond line to alleviate residual tensile strain in the weld.

EXAMPLE 3

We formed a 10 ply thick test panel from PEEK (APC-2/AS4) graphite unidirectional tape. After preparing the surface of the entire 9×15 inch panel, we applied 10 mils of PEEK adhesive film and a 10 mil thick cold rolled steel susceptor of conventional design. We heated the preform to about 780–800° F. in an oven and removed the hot preform to a press where we applied a consolidation pressure of about 1500 psi for 5 minutes until the panel had cooled below its glass transition temperature ($T_g$).

EXAMPLE 4

We formed second and third test panels using 5 mil copper mesh and PEEK (APC-HTA/IM8) prepreg material according to the process of Example 3. For the prepreg material we reduced the oven temperature to 650–680° F.

Upon removal from the press the integrated susceptor detail parts are trimmed to net size and are used in subsequent thermoplastic welding (fusion bond) operations as we have described. We can add Z-pins to the detail part if the consolidation press is configured like Avila's pin insertion tool and if we place the susceptor on the cure tool (guide busing) for directing the proper placement of the pins.

Our welding induction coil 2500 and process generally are shown in FIG. 25 with respect to the formation of a lap shear joint between two thermoplastic APC-2/AS4 composites sheets 2505 and 2510. The susceptor 2405 is integrated onto the edge of lower composite 2505 on faying surface defining the bond line (i.e. where the two composites overlap). The coil 2500 is a transverse flux coil having a primary coil 2515 and secondary coil 2520. The secondary coil 2520 preheats the bond line while the primary coil 2515 actually provides the heating necessary to complete the weld. The coil 2500 moves over the bond line at a rate of about 4–5 inch/min applying a bond line pressure of about 20–450 psi, and, preferably, 20–60 psi through leading roller 2605 (FIG. 26) and trailing rollers 2610. Force is exerted on the traveling coil 2500 through column 2615 and carriage 2620 that is attached to a gantry system (not shown) overlying the composite assembly.

The part geometry generally is without contour or with simple contour at a relatively large radius of curvature (for example, about 115 inches). The composites are about 0.100–0.250 inches thick. The bond line is about two inches wide. The susceptor is copper foil about 5 mils thick patterned to achieve substantially uniform heating on the bond line. With these parameters and suitable backup phendic tooling to retain the assembly geometry, we have achieved joints having an average strength of about 7000±350 psi.

As with our cup coil and asymmetric coil, we cool the coils 2515 and 2520 during operation, introducing cooling water through a plumbing circuit that includes inlet coupling 2525, conduit 2530, distributor 2535, outlet line 2540, and outlet coupling 2545. If the plumbing circuit is copper tubing, we can input power to the coils 2515 and 2520 through the circuit from a 50 kW–50 kHz solid state power supply coupled with a 50 kHz–50 kW isolation transformer to provide low frequency (around 8 kHz) power to the coil 2500. While we have attempted welding at frequencies between 95–200 kHz, we have discovered that in this high frequency range the magnetic field couples with the reinforcing fibers and induces eddy currents in the fibers. Such coupling leads to overheating of the assembly and delamination of the composites. At low frequencies, the energy is focused on the susceptor at the bond line in the vicinity of the weld without any significant heating in the reinforcing fibers.

Figure 29:
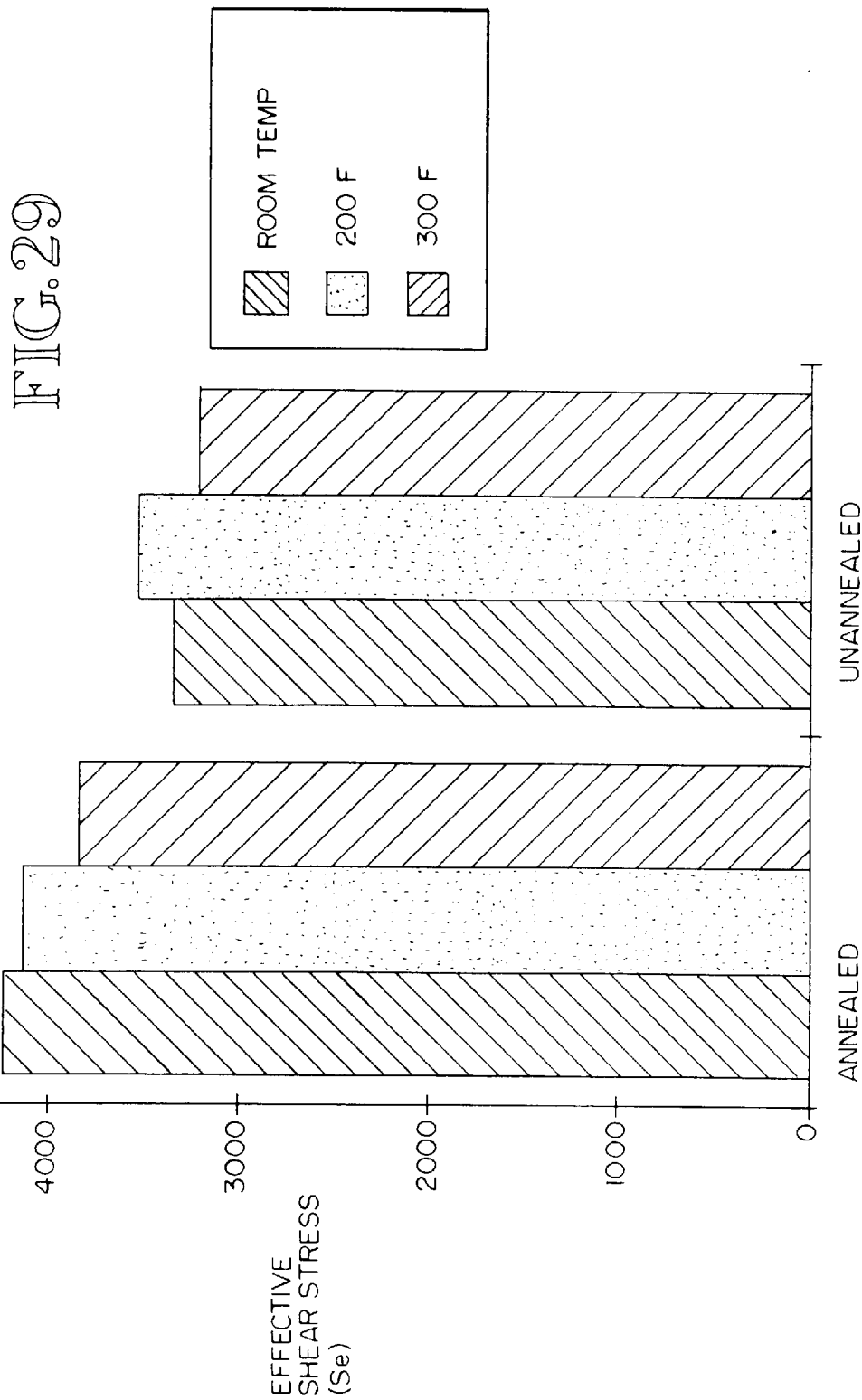
FIG. 29 is a graph illustrating the increase in strength for the weld obtained with a post-weld anneal to control the rate of cooling in the bond line.

We investigated process alternatives using a preheating step as well as a post-weld anneal to control the cooling of the bond line. FIG. 29 graphs the improvement we measured. Preheating tests were conducted at 200° F. and 300° F., respectively. Annealing involved retaining the assembly at 500° F. for 20 minutes. We conducted the heating in an oven at atmospheric pressure.

We discovered that there was little advantage with preheating, but that the post-weld anneal and its controlled cooldown offered a significant strength improvement and a higher quality weld. Parts made with the anneal also showed lower process variance.

Figure 28:
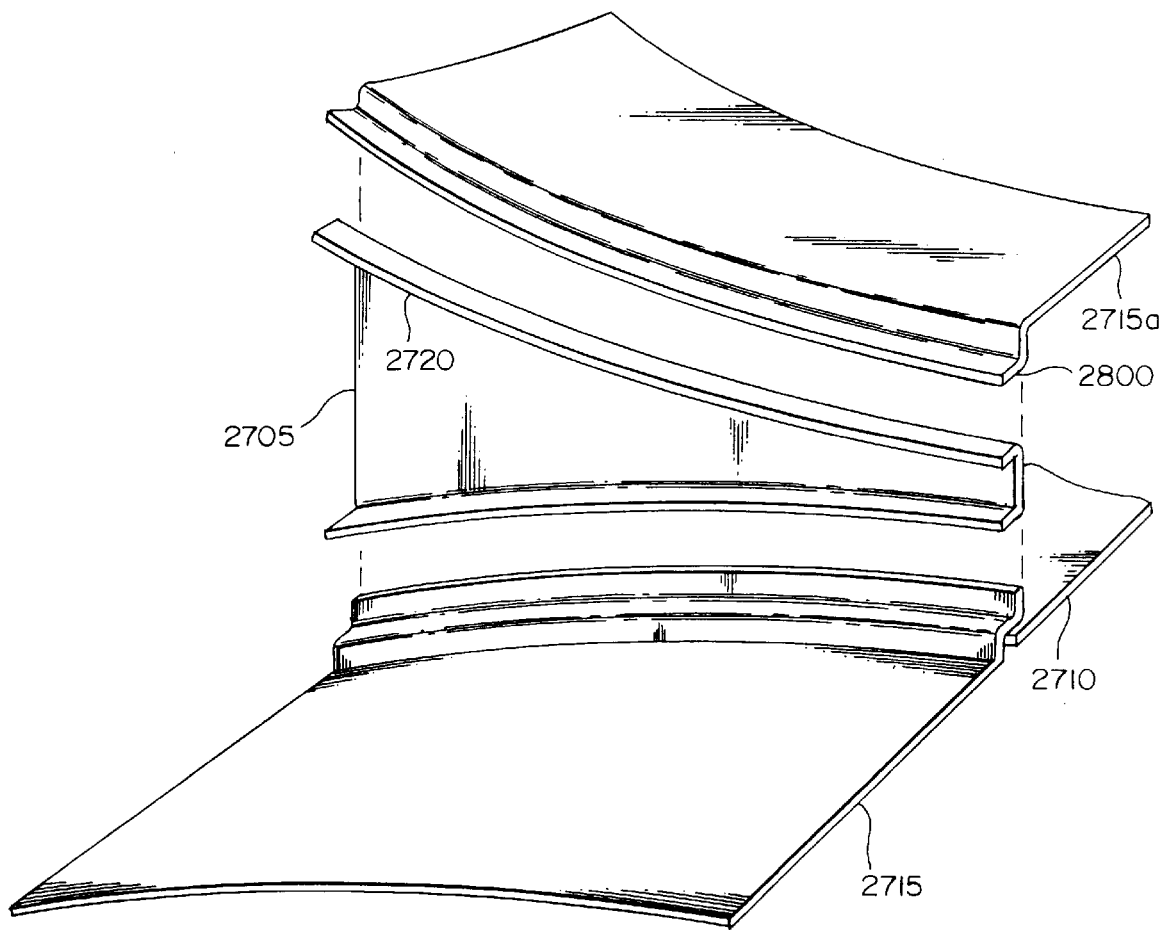
FIG. 28 is a schematic assembly view of the structure of FIG. 27.

FIGS. 26–28 illustrate more realistic aerospace structural assemblies that we have welded. In particular these figures illustrate a skin/spar joint wherein a "C" spar 2705 is welded to skin panels 2710 and 2715 through a series of lap shear joints. As shown in FIG. 26, the composite parts are pinned together (area 2650) in the trim region of the detail parts to define the bond line 2675 where the susceptor rests between the faying surfaces. The coil 2500 in FIG. 26 travels from left to right over the bond line 2675 to create the fusion bond or weld 2750 (FIG. 27). As best shown in FIG. 27, the weld 2750 can interconnect skin panel 2710 to spar flange 2720 and skin shoulder 2725 or the skin panel 2710 might be welded to the shoulder through weld 2750*a*, and the shoulder separately welded to the spar flange 2720 through weld 2750*b*. In the case of the single weld 2750, a tongue 2730 on skin panel 2715 might be welded, bonded, fastened, or otherwise connected to the web of spar 2705 to provide the desired strength and rigidity in the structure.

In an alternate construction, a shoulder 2800 on the end of skin panel (not shown). In this arrangement or the corresponding one illustrated at the bottom of FIG. 27, Z-pins through the aligned faying surfaces would be particularly beneficial and relatively easy to introduce to the bonded assembly.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples illustrate the invention and are not intended to limit it. Accordingly, define the invention with the claims and limit the claims only as necessary in view of the pertinent prior art.

We claim:

1. A method for integrating a susceptor into a composite detail part along a bond line on a faying surface, comprising the steps of:
   (a) placing on the part at the intended bond line a thermoplastic film having a glass transition temperature;
   (b) placing a metal mesh susceptor over the film to form a part-film-susceptor preform; and
   (c) bonding the film and susceptor with a bond to the part to position the susceptor on the faying surface of the part.

2. The method of claim 1 wherein bonding includes:
   (a) heating the part-film-susceptor preform to a temperature above the glass transition temperature of the film; and
   (b) applying a consolidation pressure to the suspector and film while cooling the preform below the glass transition temperature.

3. The method of claim 1 wherein the susceptor is a metal susceptible to induction heating.

4. The method of claim 3 wherein the susceptor has a Curie point to protect the bond against overheating during induction heating.

5. The method of claim 1 wherein bonding includes heating the film and susceptor in an oven.

6. The method of claim 1 further comprising the step of:

applying a consolidation pressure of about 1500 psi after bonding the film and susceptor to the part.

7. A method for intergrating a susceptor along a bond line on a faying surface in a reinforced thermoplastic composite part comprising the steps of:

(a) placing a thermoplastic film, having a glass transition temperature, on the part at the intended bond line;

(b) placing a metal mesh susceptor over the film to form a part-film-susceptor preform;

(c) bonding the film and susceptor with a bond to the part to position the susceptor on the faying surface of the part; and (d) inserting Z-pin reinforcement through the suspector at the intended bond line.

8. The method of claim 7 wherein inserting leaves Z-pin stubble.

9. The method of claim 7 wherein the susceptor is an alloy having a Curie temperature and contains one of Co, Ni, Fe and a mixture thereof.

10. The method of claim 7 wherein bonding includes heating in an oven.

11. The method of claim 10 wherein the susceptor is an alloy having a Curie temperature and contains one of Co, Ni, Fe and a mixture thereof.

12. The method of claim 8 wherein Z-pins are inserted at an areal density up to about 1.50% in a selected orientation.

\* \* \* \* \*